(12) United States Patent
Kobayashi et al.

(10) Patent No.: US 7,351,185 B2
(45) Date of Patent: Apr. 1, 2008

(54) TRANSMISSION CONTROL DEVICE OF MOTORCYCLE

(75) Inventors: Fuyuki Kobayashi, Saitama (JP); Kohsaku Murohashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 192 days.

(21) Appl. No.: 11/219,854

(22) Filed: Sep. 7, 2005

(65) Prior Publication Data
US 2006/0068975 A1 Mar. 30, 2006

(30) Foreign Application Priority Data
Sep. 8, 2004 (JP) .............................. 2004-260851

(51) Int. Cl.
*B60W 10/10* (2006.01)
(52) U.S. Cl. ........................ 477/111; 477/107; 477/109; 477/110
(58) Field of Classification Search ...................... None
See application file for complete search history.

(56) References Cited
U.S. PATENT DOCUMENTS
4,945,481 A * 7/1990 Iwatsuki et al. .............. 701/54
5,417,625 A * 5/1995 Yamaki et al. .............. 477/109
6,761,664 B2 * 7/2004 Ayabe et al. ................ 477/144
7,052,435 B2 * 5/2006 Tabata et al. ................ 477/107

FOREIGN PATENT DOCUMENTS
JP 4-12141 A 1/1992

* cited by examiner

*Primary Examiner*—David D. Le
(74) *Attorney, Agent, or Firm*—Birch, Stewart, Kolasch & Birch, LLP

(57) ABSTRACT

A transmission control device for a vehicle for smoothly performing a transmission manipulation without a clutch manipulation. The device includes a control unit which determines a shift operation starting time based on a detection signal of a shift operation detector, and controls an intake air amount to an engine corresponding to a gear shift position detected by a gear shift position detection means thereby changing an output of the engine. The control unit obtains a target initial throttle opening corresponding to the gear shift position from a target initial throttle opening table, obtains data on throttle opening, time and an attenuation ratio corresponding to the gear shift position from a throttle opening, time and attenuation ratio table, and determines the opening time and the target throttle opening. Next, the control unit determines an injection amount and executes control to increase the intake air amount and the injection quantity.

20 Claims, 18 Drawing Sheets data table on throttle opening, time and attenuation ratio

| gear shift position (speed) | first segment | | | second segment | | | ... | nth segment | | |
|---|---|---|---|---|---|---|---|---|---|---|
| | Th opening | segment time t I | attenuation ratio α I % | Th opening | t II | α II | | Th opening | t n | α n |
| 1 (no shift down) | — | — | — | — | — | — | ... | — | — | — |
| 2 | θin2-1 | tin2-1 | αin2-1 | θin2-II | tin2-II | αin2-II | ... | θin2-n | tin2-n | αin2-n |
| 3 | θin3-1 | tin3-1 | αin3-1 | θin3-II | tin3-II | αin3-II | ... | θin3-n | tin3-n | αin3-n |
| 4 | θin4-1 | tin4-1 | αin4-1 | θin4-II | tin4-II | αin4-II | ... | θin4-n | tin4-n | αin4-n |
| 5 | θin5-1 | tin5-1 | αin5-1 | θin5-II | tin5-II | αin5-II | ... | θin5-n | tin5-n | αin5-n |
| 6 | θin6-1 | tin6-1 | αin6-1 | θin6-II | tin6-II | αin6-II | ... | θin6-n | tin6-n | αin6-n |

FIG. 9

FIG. 12(a. pulse output of shift operation detector $S_A$)

FIG. 12(b. shift drum developed view)

FIG. 12(c. voltage output of the shift drum operation detector $S_B$)

| required intake air amount (Q) | Q5 | Q4 | Q3 | Q2 | Q1 |
|---|---|---|---|---|---|
| open/close valves to be opened | 2 | 4 | 6 | 8 | 10 |

# TRANSMISSION CONTROL DEVICE OF MOTORCYCLE

CROSS-REFERENCE TO RELATED APPLICATION

The present application claims priority under 35 U.S.C. §119 to Japanese Patent Application No. 2004-260851, filed Sep. 8, 2004, the entire contents of which are hereby incorporated by reference.

BACKGROUND OF THE INVENTION

1. Field of the Invention

The present invention relates to a transmission control device of a motorcycle, and more particularly to a transmission control device of a motorcycle which can perform a control of an engine output in conformity with a gear shift position at the time of performing the transmission thus realizing a smooth transmission manipulation.

2. Description of Background Art

Conventionally, in a vehicle such as a motorcycle, at the time of performing the transmission, a shift operation of a transmission is generally performed by rotatably manipulating a shift pedal in a state that a clutch is disengaged. On the other hand, with respect to an automobile for racing, a more rapid shift manipulation is requested and, as described in Japanese Patent Application No.: JP-A-4-12141, there has been known a motorcycle which controls an ignition time in conformity with an actual shift operation starting time of the transmission, for example, thus performing an increase/decrease control of an engine output whereby a rapid transmission operation can be performed without requiring a clutch operation.

However, in a technique disclosed in Patent Application No.: JP-A-4-12141, a means which controls the increase/decrease control of the engine output controls the ignition time in response to a throttle opening and an engine rotational speed and hence, it is impossible to perform an optimum engine output control at all gear shift positions, whereby there have been drawbacks including difficulty in performing a smooth transmission manipulation.

SUMMARY AND OBJECTS OF THE INVENTION

The present invention has been made in view of such drawbacks, and it is an object of the present invention to provide a transmission control device of a vehicle such as a motorcycle which can perform a more optimum control of the engine output in conformity with respective gear shift positions thus realizing a smooth transmission without requiring a clutch manipulation.

To achieve the above-mentioned object, the present invention provides a transmission control device of a motorcycle which includes a shift manipulation member which performs a shift operation; a shift operation detector which is arranged on a member which is operated in an interlocking manner with the shift manipulation member; and a shifter which is interlockingly connected with the shift manipulation member and is capable of transmitting a drive torque of an engine by selecting a gear among gears at a plurality of gear shift positions with the manipulation of the shift manipulation member. The first feature of the present invention lies in that the transmission control device further includes a gear shift position detection means which detects a position of the gear shift position, and a control unit which determines a shift operation starting time in response a detection signal of the shift operation detector, and controls at least an intake air amount to the engine corresponding to the gear shift position detected by the gear shift position detection means thus controlling the engine so as to allow an output of the engine to be changed smoothly.

Further, a second feature of the present invention lies in that the transmission control device includes an actuator which is connected with the intake air amount control means and controls opening/closing of the intake air amount control means, wherein the control unit controls the actuator.

Further, a third feature lies in that the control unit performs an opening control of the intake air amount control means when the control unit determines a shift-down manipulation starting time based on the shift operation detector.

Further, a fourth feature lies in that the control unit controls a degree of opening and an opening time of the intake air amount control means upon completion of a shift change in a shift-down thus gradually closing the intake air amount control means.

Further, a fifth feature lies in that the transmission control device further includes a bypass passage which bypasses the intake air amount control means and connects an upstream side and a downstream side of the intake air amount control means, and an open/close valve which is provided to the bypass passage and controls the introduction of intake air by opening and closing thereof, wherein the control unit controls the open/close valve.

Further, a sixth feature lies in that the engine includes a plurality of cylinders and the bypass passage which includes the open/close valve is provided corresponding to each cylinder, and the control unit controls the number of open/close valves which are opened thus controlling the intake air amount to the engine.

Further, a seventh feature lies in that the control unit performs an opening control of the open/close valves when the control unit determines a shift-down manipulation starting time based on the shift operation detector.

Further, an eighth feature lies in that the control unit performs a control to gradually decrease the number of the open/close valves which are opened after completion of the shift change in the shift-down thus allowing the intake air amount to be gradually decreased.

According to the first feature of the present invention, when the shift operation starting is detected, at least the intake air amount to the engine is controlled corresponding to the gear shift position and hence, in the transmission manipulation which makes the clutch operation unnecessary, it is possible to change the output of the engine more smoothly. Particularly, since the intake air amount is controlled, compared to only the ignition time control, it is possible to control the increase/decrease of the engine rotational speed more precisely whereby a transmission shock which may arise in the transmission manipulation time can be reduced.

According to the second feature of the present invention, the actuator which controls the opening and closing of the intake air amount control means is controlled and hence, it is possible to perform the optimum control of the engine output in conformity with respective gear shift positions.

According to the third feature of the present invention, the output increase control of the engine is performed in a state that the engine output is increased by performing the open control of the intake air amount control means at the time of starting the shift-down manipulation and hence, it is possible to perform the clutchless manipulation at the time of shift-down using the simple means and the simple control. On the other hand, the large increase of the output cannot be obtained with only the conventional ignition time control and hence, it is difficult to perform the clutchless manipulation at the time of shift-down.

According to the fourth feature of the present invention, the control unit controls a degree of opening and an opening time of the intake air amount control means upon completion of a shift change in a shift-down thus gradually closing the intake air amount control means. Accordingly, even when an engine output torque is transmitted to rear wheels by way of the transmission, it is possible to reduce a shock attributed to the torque fluctuation.

According to the fifth feature of the present invention, the engine output is controlled by controlling the open/close valves of the bypass passage in response to the respective gear shift positions and hence, it is possible to perform the optimum control of the engine output in conformity with the respective gear shift positions whereby the transmission operation which makes the clutch operation unnecessary can be performed smoothly.

According to the sixth feature of the present invention, the control unit controls the intake air amount by controlling the number of open/close valves which are opened and hence, it is possible to perform the intake air amount control more easily. Further, a load applied to the control unit can be also reduced.

According to the seventh feature of the present invention, the output increase control of the engine is performed by increasing the engine output with the open control of the open/close valve at the time of starting the shift-down manipulation and hence, compared to the conventional ignition time control, it is possible to obtain the large increase of the output. Further, since the relatively small-sized open/close valve can be used, the open/close manipulations of the open/close valves can be rapidly performed thus realizing the more rapid engine output control and transmission.

According to the eighth feature of the present invention, the control unit performs a control to gradually decrease the number of the open/close valves which are opened after completion of the shift change in the shift-down. Accordingly, even when the engine output torque is transmitted to the rear wheels by way of the transmission, it is possible to reduce the shock attributed to the torque fluctuation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a data table on throttle opening, time and attenuation ratio according to the first embodiment of the present invention;

DETAILED DESCRIPTION OF THE PREFERRED EMBODIMENTS

Figure 1:
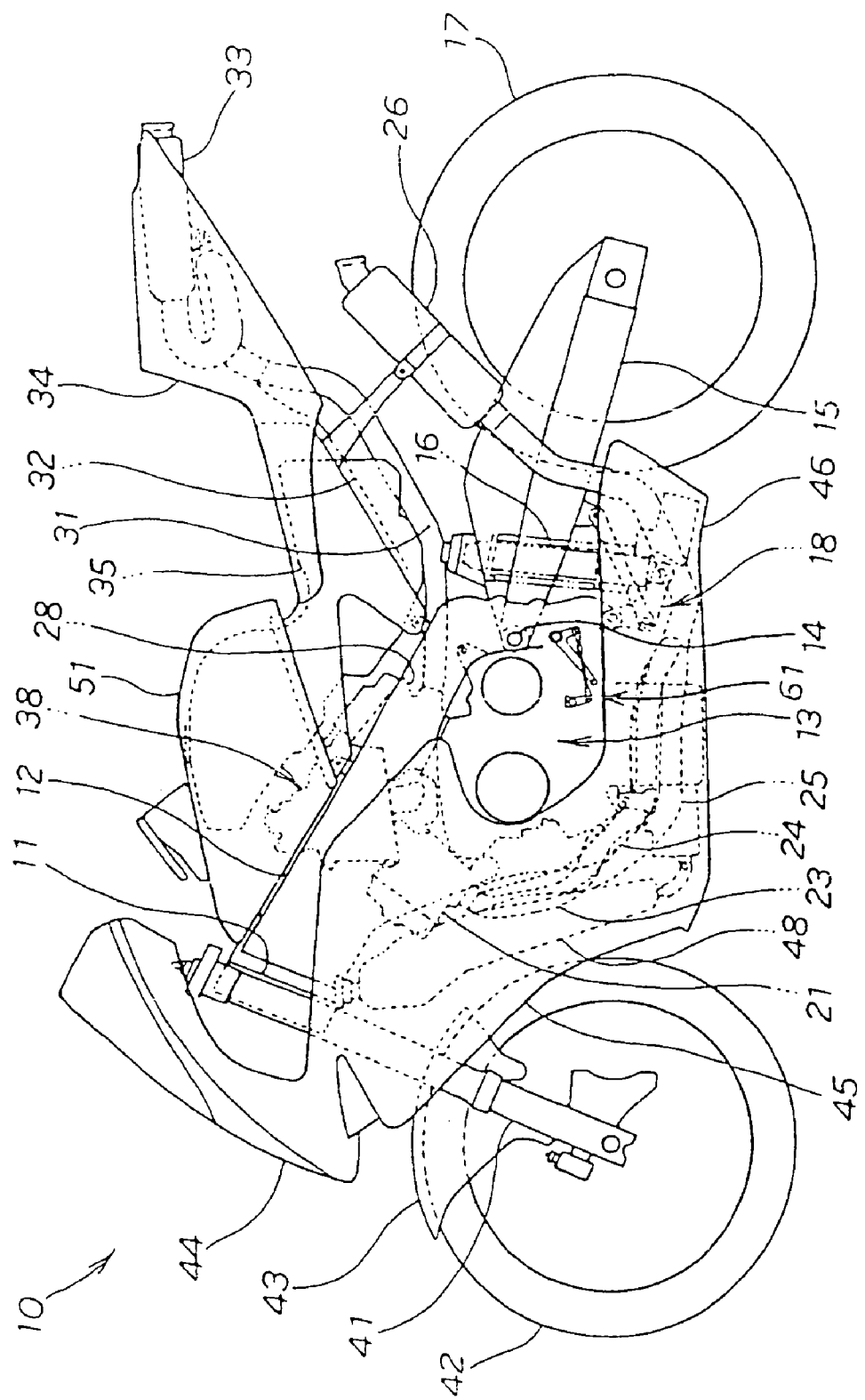
FIG. 1 is a view showing the whole constitution of a motorcycle according to an embodiment of the present invention.

First of all, the schematic constitution of one example of a motorcycle to which the present invention is applicable is explained in conjunction with FIG. 1. FIG. 1 is a side view of the motorcycle which includes a transmission control device according to the present invention. In the motorcycle 10, a pair of left and right main frames 12, 12 (only the symbol 12 on a reader's side shown in the drawing) extend rearwardly and downwardly in an inclined manner and a V-type engine 13 is mounted on lower portions of these main frames 12, 12. A swing arm 15 is vertically swingably mounted on rear portions of the main frames 12, 12 by way of a pivot shaft 14. An upper end of a rear cushion unit 16 is mounted on an upper portion of a front portion of the swing arm 15 and, at the same time, a rear wheel 17 is mounted on a rear end portion of the swing arm 15. A lower end of the rear cushion unit 16 is mounted on a lower end portion of the rear portion of the main frame 12 by way of a link device 18.

Exhaust pipes 23 to 25 which are provided for respective cylinders of the engine 13 extend rearwardly from cylinder heads 21 in front of the engine 13. These exhaust pipes 23 to 25 are, first of all, converged and, thereafter, are connected to a left muffler 26 mounted on a front side as viewed from a reader. On the other hand, the exhaust pipes 31, 32 which are provided for respective cylinders extend rearwardly from a cylinder head 28 disposed on a rear side of the engine 13. Further, these exhaust pipes 31, 32 are converged once and, thereafter, are connected with a rear muffler 33 mounted on a rear portion of the vehicle body. A seat cowl 34 which also functions as a seat extends rearwardly from upper portions of the main frames 12, 12. A fuel tank 35 is mounted on the inside of the seat cowl 34.

The engine 13 is configured to mount a throttle body 38 between the cylinder heads 21, 28 and a transmission control device of the present invention is mounted on the throttle body 38. Also shown are a front fork 41 which is rotatably mounted on the head pipe 11, a front wheel 42 which is mounted on a lower end of the front fork 41, a front fender 43 which covers the front wheel 42 from above, an upper cowl 44, a middle cowl 45, a lower cowl 46, a radiator 48, a tank cover 51, and a shift device 61.

Figure 2:
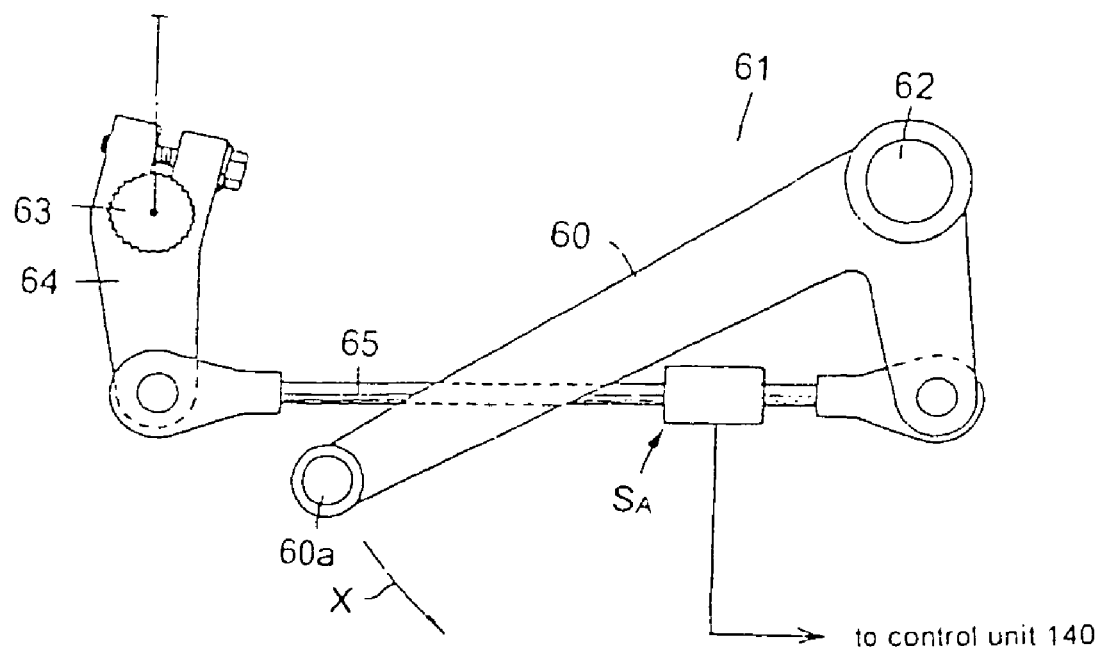
FIG. 2 is a plan view of a shift device.

FIG. 2 shows a specific example of the above-mentioned shift device 61. The shift device 61 is configured to perform the shift-up when a shift pedal 60, that is, a shift manipulation member is stepped in the direction indicated by an arrow X and performs the shift-down when the shift manipulation member is rotatably manipulated in the direction opposite to the arrow X. The shift pedal is formed in an approximately L-shape and includes a step-in portion 60a at one end thereof and has a bent portion thereof supported on the vehicle body of the motorcycle by way of a shaft 62. The shift device 61 includes a rotary arm 64 which has a proximal end thereof fixed to a shift shaft 63 which is pivotally supported on a crankcase (see FIG. 4) and a link 65 which connects the shift pedal 60 and the rotary arm 64. In the shift device 61 having such a constitution, due to the manipulation of the shift pedal 60, a shift drum 157 (see FIG. 4) which is connected with the shift shaft 63 by way of a connecting mechanism is rotatably driven whereby the shift manipulation is executed. In this embodiment, a shift operation detector $S_A$ is provided to the link 65 which is interlockingly operated with the shift pedal 60.

Figure 3:
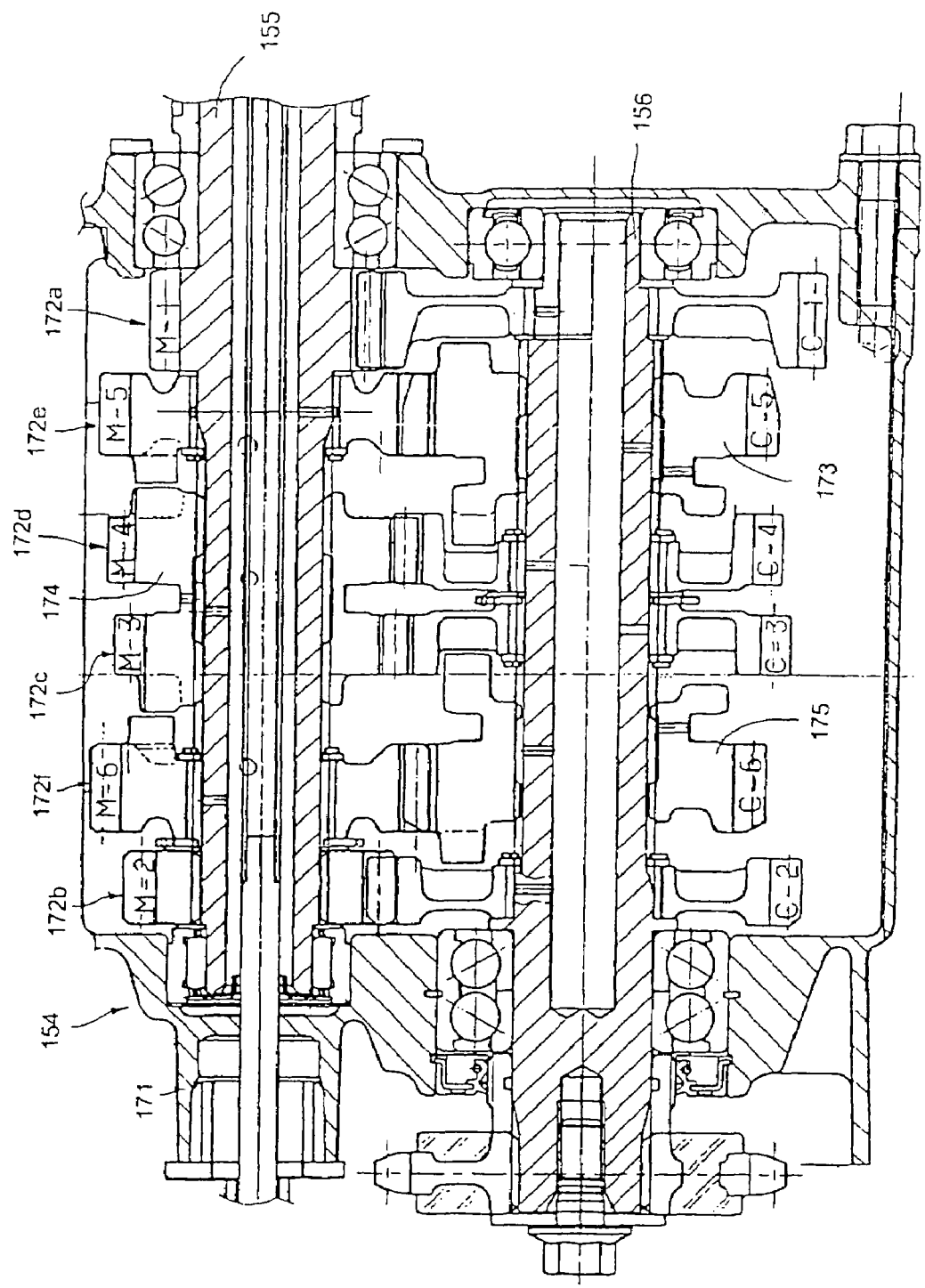
FIG. 3 is a cross-sectional view of a gear transmission.

FIG. 3 shows a gear transmission 154 which is mounted in the inside of the engine 13. The gear transmission 154 is constituted as a transmission for 6 gear shift positions, for example, and the general constitution of the transmission for 6 gear shift positions is shown in FIG. 3. In a crankcase 171 of the gear transmission 154, a main shaft 155 which is connected with a crankshaft 163 (see FIG. 4) by way of a power transmission mechanism (not shown in the drawing), a countershaft 156 which is connected with the rear wheel by way of a chain drive mechanism (not shown in the drawing), and a shift drum 157 (see FIG. 4) are supported rotatably about axes thereof and parallel to each other, shifter guide shafts 158, 159 (see FIG. 4) are arranged in parallel with these shafts 155, 156, 157, and between the main shaft 155 and the countershaft 156, gear trains 172a, 172b, 172c, 172d, 172e, 172f which respectively establish the first, the second, the third, the fourth, the fifth, and the sixth gear shift positions are interposed.

Further, shifters 160, 161 (see FIG. 4) which are individually engaged with shift gears 173, 174, 175 are fitted on shifter guide shafts 158, 159 in a slidable manner in the axial direction, and guide pins (not shown in the drawing) which are mounted on these shifters 160, 161 in an erected manner are respectively engaged with lead grooves (not shown in the drawing) formed in an outer periphery of the shift drum 157 in a relatively movable manner. Further, the shift shaft 63 (see FIG. 2) and the above-mentioned shift drum 157 are connected with each other by way of a conventionally well-known connecting mechanism. Accordingly, when the shift manipulation is performed with the shift pedal 60, due to the intermittent rotational operation of the shift drum for every given shift angle, the shifters 160, 161 are selectively slidably driven and hence, one of the above-mentioned respective gear trains 172a to 172f is selectively established. On a shaft end portion of the shift drum 157, a shift drum operation detector SB which detects the shift operation in response to a rotational angle, that is, a gear shift position detection means (see FIG. 4) is mounted.

Figure 4:
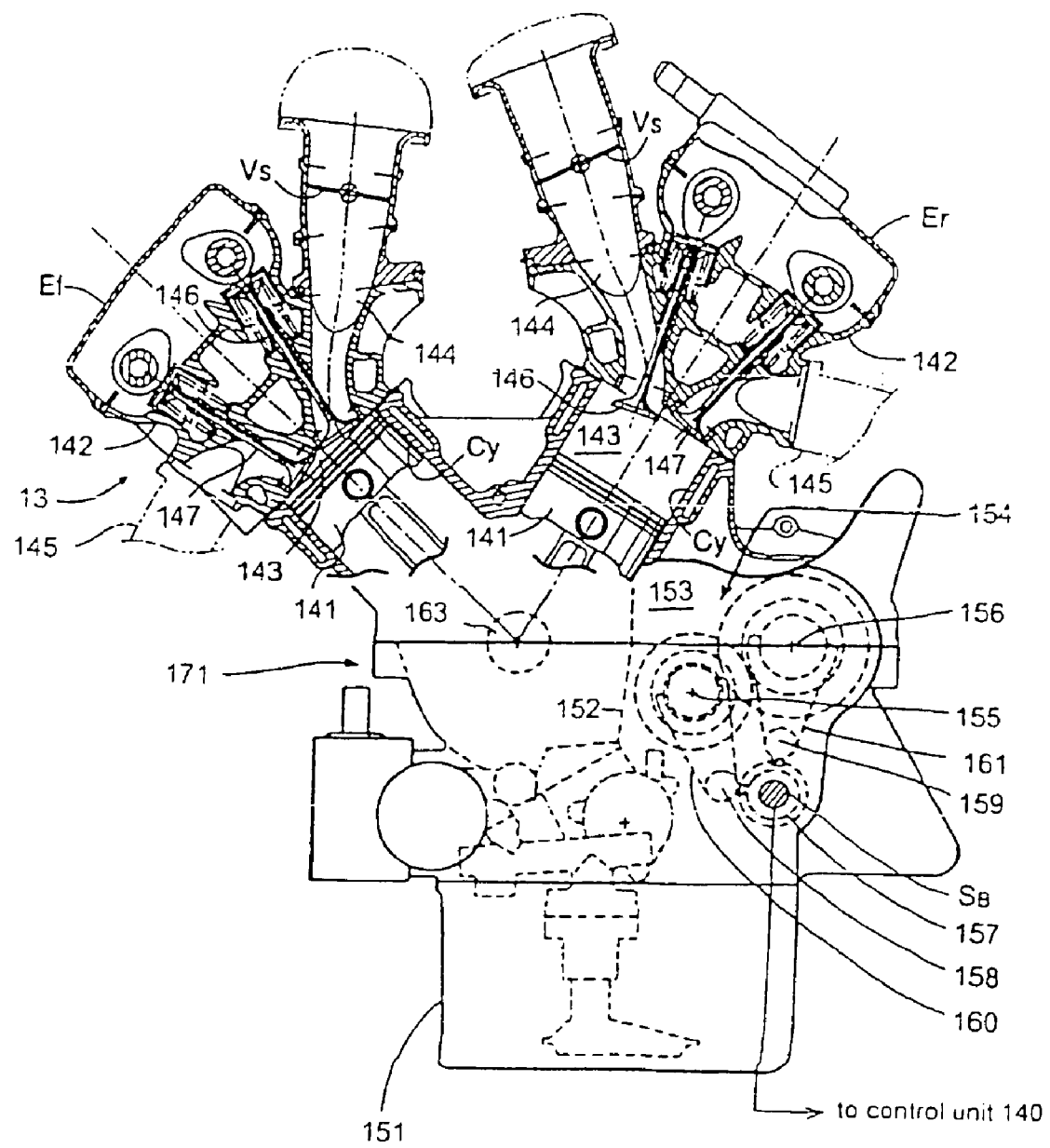
FIG. 4 is a cross-sectional view of an upper portion of an engine of the motorcycle according to the embodiment of the present invention and a side view of a lower portion of the engine.

FIG. 4 is a cross-sectional view (upper side) and a side view (lower side) of the engine 13. The engine 13 is a V-type multi-cylinder engine which has front and rear banks Ef, Er thereof formed in a V shape. On the front bank Ef, cylinders Cy which are respectively inclined forwardly and are arranged laterally each other are mounted in parallel, while on the rear bank Er, cylinders Cy which are respectively inclined rearwardly and are arranged laterally each other are mounted in parallel. Between pistons 141 which are fitted in the inside of the respective cylinders Cy and lower surfaces of the respective cylinder heads 142 of the front and rear banks Ef, Er, combustion chambers 143 are respectively defined. An intake air passage 144 and an exhaust passage 145 respectively open in each combustion chamber 143 and opening portions of these passages 144, 145 are opened or closed by an intake valve 146 and an exhaust valve 147 which are interlockingly operated with the crankshaft of the engine 13.

An upstream end of the intake air passage 144 is communicated with atmosphere through an air cleaner AC (see FIG. 14), and in the midst of the intake air passage 144, a throttle valve Vs which is opened or closed in an interlocking manner with the throttle manipulation is provided. Due to this throttle valve Vs, an intake air amount to the corresponding cylinder Cy (that is, combustion chamber 143) is controlled.

To a lower end surface of the crankcase 171, an oil pan 151 is fastened. A rear side and a lower side of a partition wall 152 and the inside of the oil pan 151 define one continuous space. A space defined on the rear side of the partition wall 152 defines a transmission chamber 153, and a multiple disc friction clutch (not shown in the drawing) and a constant meshing gear transmission 154 are accommodated. In the transmission chamber 153, the main shaft 155, the counter shaft 156, the shift drum 157, the shifter guide shafts 158, 159 of the transmission which is directed in the lateral direction are arranged. The main shaft 155 of the gear transmission is driven by way of the gears mounted on an end portion of the crankshaft 163 and the multiple disc friction clutch. Six gears are respectively mounted on the main shaft 155 and the countershaft 156 thus constituting the gear transmission 154. On the shifter guide shafts 158, 159, the shifters 160, 161 which move the axially movable gears on the main shaft 155 and the countershaft 156 in the above-mentioned transmission are supported, and the shifters 160, 161 are axially driven by way of pins which are engaged with the grooves formed in the shift drum which is mounted on a boss portion of the shifter in a projecting manner. The shift drum operation detector $S_B$ is mounted on a shaft end portion of the shift drum 157. The shift drum operation detector $S_B$ detects not only the above-mentioned shift operation but also the gear shift positions.

Figure 5:
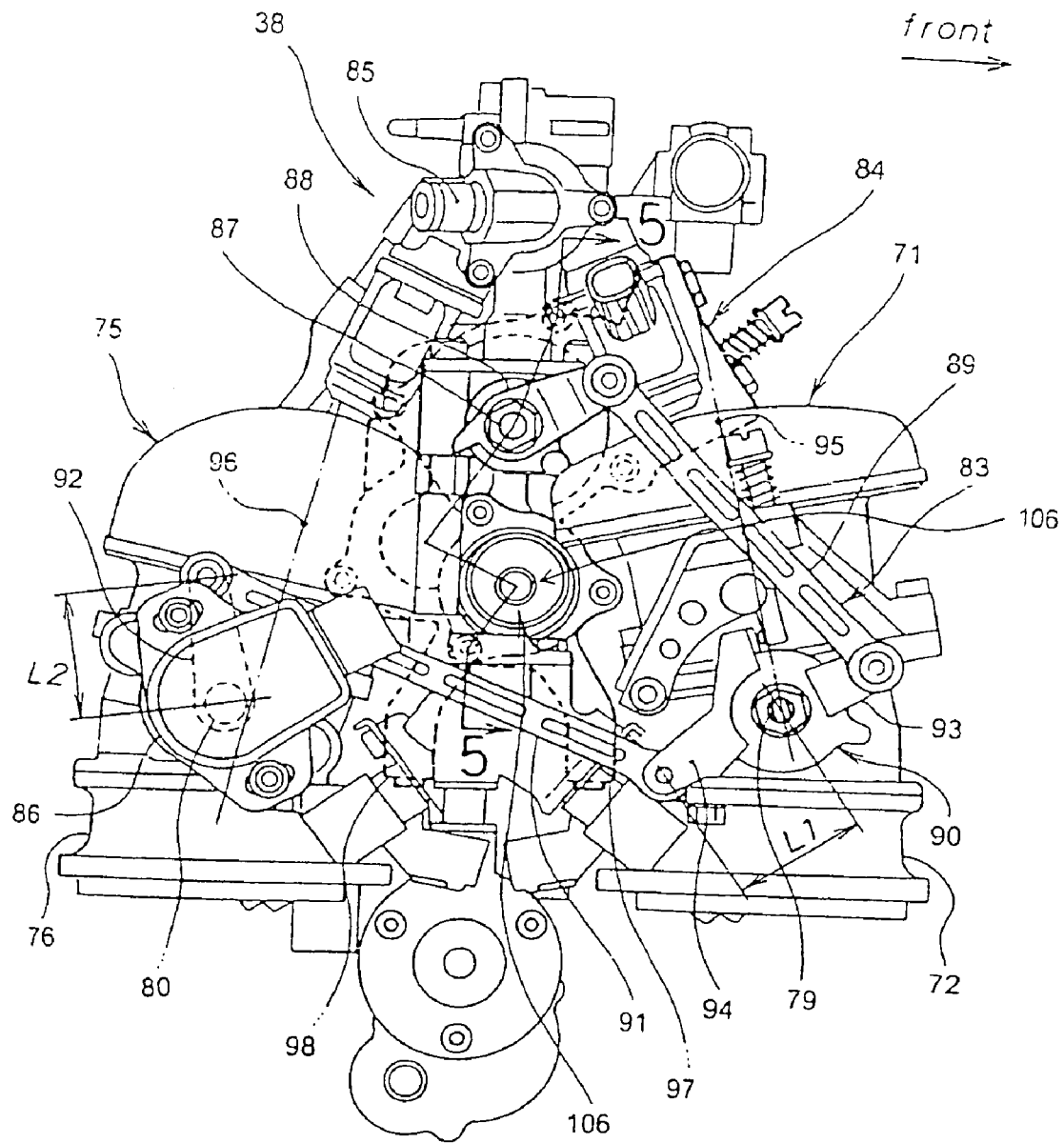
FIG. 5 is an assembled constitutional view of a throttle body according to the embodiment of the present invention.

FIG. 5 is a right side view of the above-mentioned throttle body 38. A front throttle portion 71 is integrally formed on a throttle base 72, while a rear throttle portion 75 is integrally formed on a throttle base 76.

Further, the throttle body 38 is constituted of a device in which one front valve shaft 79 is allowed to penetrate respective front throttle portions 71, one rear valve shaft 80 is allowed to penetrate respective rear throttle portions 75, and a throttle valve opening control device 84 (hereinafter simply referred to as "throttle control device 84") is connected to the front valve shaft 79 and the rear valve shaft 80 by way of a link mechanism 83 which constitutes a connecting member.

The throttle control device 84 is mounted on a connecting member (not shown in the drawing) which is mounted on the throttle base 72. Numeral 85 indicates a hose connecting portion which is connected with a fuel pump (not shown in the drawing) by way of a fuel hose (not shown in the drawing), and numeral 86 indicates a throttle opening sensor which detects the degree of opening of the throttle valve $V_S$ (see FIG. 4) by being connected to an end portion of the rear valve shaft 80. The throttle control device 84 includes an output shaft 87 which is rotated along with the manipulation of a throttle grip formed on a handle, and a link mechanism 83 which is connected with the output shaft 87.

The link mechanism 83 is constituted of a first arm member 88 which is mounted on an end portion of the output shaft 87, a first link 89 which has one end thereof mounted on the first arm member 88, a second arm member 90 which is connected with another end of the first link 89 and is mounted on an end portion of the front valve shaft 79, a second link 91 which has one end thereof connected with the second arm member 90, and a third arm member 92 which is connected with another end of the second link 91 and is also mounted on the rear valve shaft 80.

The second arm member 90 is an integrally formed part which is constituted of a front arm portion 93 which is connected with the first link 89 and a rear arm portion 94 which is connected with the second link 91. An arm length L1 of the rear arm portion 94 is set equal to an arm length L2 of the third arm member 92. By taking these arm lengths L1, L2, angles of the rear arm portion 94 and the third arm member 92, and a total length of the second link 91 into consideration, the difference between rotational angles of the front valve shaft 79 and the rear valve shaft 80 is set small within a range where these angles are small.

In the drawing, numeral 95 indicates a center line which passes the center of the intake air passage of the front throttle portion 71, while numeral 96 indicates a center line which passes the center of the intake air passage of the rear throttle portion 75. These center lines 95, 96 are inclined such that upper sides thereof become close to each other. By inclining these center lines 95, 96, it is possible to decrease the sizes in the fore-and-aft direction of an upper portion of the throttle body 38.

Leg portions 97, 98 are mounted on the throttle control device 84 for mounting the throttle control device 84 on a connecting member which connects the front throttle portion 71 and the rear throttle portion 75. Numeral 106 indicates an actuator (driving motor).

Figure 6:
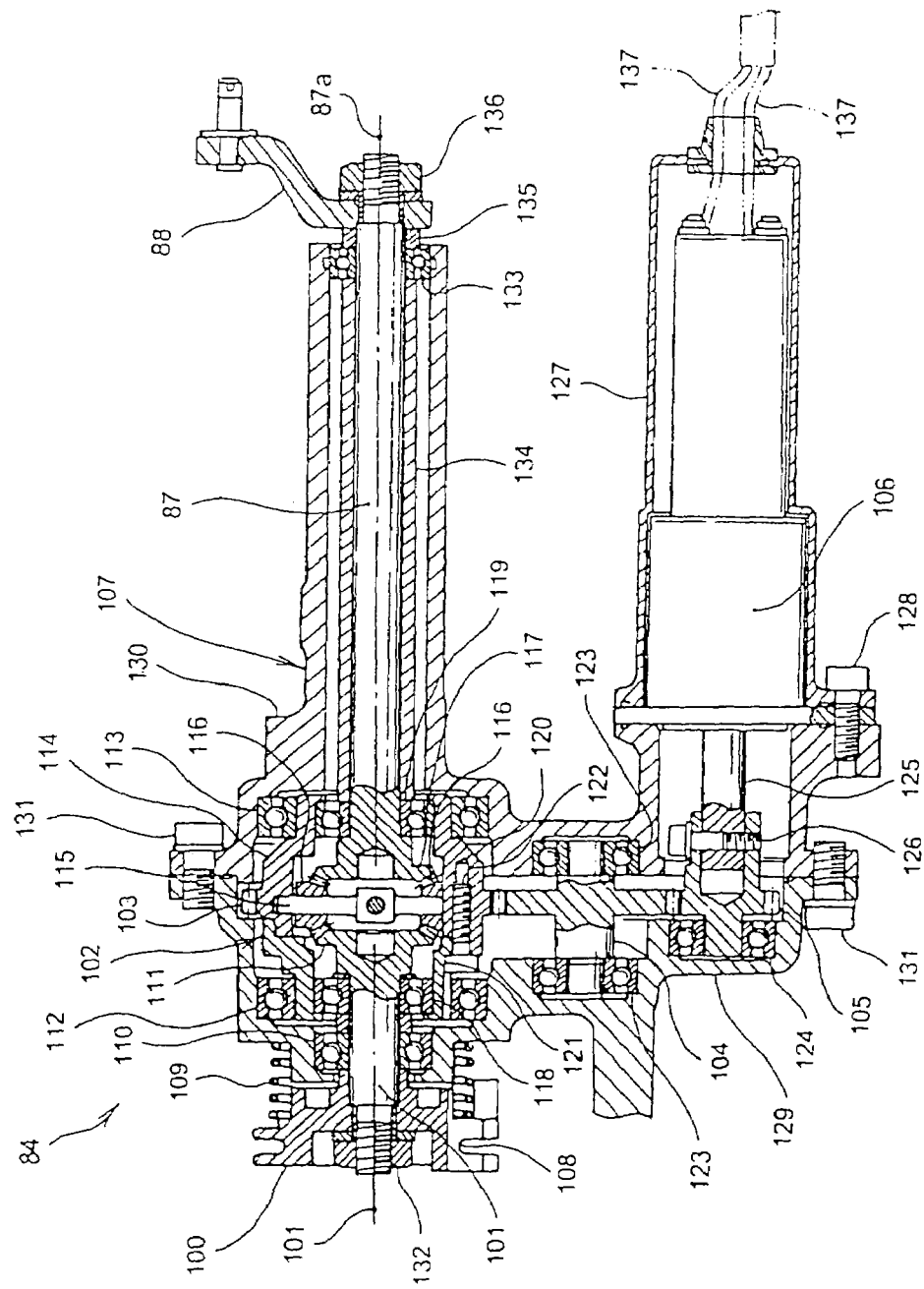
FIG. 6 is a cross-sectional view of a throttle control device.

FIG. 6 is a cross-sectional view of the throttle control device 84 and also is a cross-sectional view taken along a line 5-5 in FIG. 5. A throttle control device 84 is constituted of a drum 100 which is connected with a throttle grip (not shown in the drawing) by way of a wire, an input shaft 101 which is mounted on the drum 100 as a rotary shaft, a power transmission device 102 which is connected with the input shaft 101, the above-mentioned output shaft 87 which is held by the power transmission device 102, the link mechanism 83 (see FIG. 5) which is connected with the output shaft 87, an intermediate gear 104 which is meshed with a large gear 103 which is mounted on the power transmission device 102, the drive gear 105 which is meshed with the intermediate gear 104, an actuator 106 which is connected with the drive gear 105, and an accommodating casing 127 which accommodates a most portion of the above-mentioned input shaft 101, the power transmission device 102, a most portion of the output shaft 87, the intermediate gear 104, the drive gear 105 and the actuator 106.

The drum 100 includes a wire groove 108 in which the wire is wound and a torsion coil spring 109 is interposed between the drum 100 and the accommodating casing 107. Here, the torsion coil spring 109 constitutes a part which generates a resilient force for returning the drum 100 in the direction opposite to the direction that the throttle grip is rotated, that is, on the side that the throttle valve $V_s$ (see FIG. 4) is closed. The input shaft 101 is rotatably mounted in the accommodating casing 107 by means of bearings 110 and has an input-side bevel gear 111 integrally formed on an end portion thereof.

The power transmission device 102 includes a split-type casing portion 114 which is rotatably mounted on the accommodating casing 107 by way of bearings 112, 113, a cruciform support shaft 115 which is mounted on the casing portion 114, small bevel gears 116 . . . ( . . . indicating plural number, this definition being used in the same manner hereinafter) which are rotatably mounted on the support shaft 115, and the above-mentioned input-side bevel gear 111 and output-side bevel gear 117 which are meshed with these small bevel gears 116 . . . .

The casing portion 114 also constitutes a member which is rotatably mounted on the input shaft 101 by way of a bearing 118 and, at the same time, is rotatably mounted on the output shaft 87 by way of a bearing 119. The casing portion 114 is constituted of a casing portion body 120 which allows the above-mentioned large gear 103 to be integrally formed thereon and supports the support shaft 115, and a cover body 121 which is provided on the input shaft 101 side to close an opening portion of the casing portion body 120. Here, numeral 122 indicates bolts which mount a cover portion 121 to the casing portion body 120.

The output-side bevel gear 117 is integrally formed on the output shaft 87. The intermediate gear 104 is a part which is rotatably mounted on the accommodating casing 107 by way of bearings 123, 123. The drive gear 105 constitutes a part which is rotatably mounted on the accommodating casing 107 by way of a bearing 124 and is connected with a rotary shaft 125 of the actuator 106 using bolts 126.

The actuator 106 is covered with a motor casing 127 and is mounted on the accommodating casing 107 together with the motor casing 127 using common bolts 128. The accommodating casing 107 is formed by joining a first casing 129 and a second casing 130 using bolts 131 . . . .

An axis 101a of the input shaft 101 and an axis 87a of the output shaft 87 are arranged on a straight line. The rotary shaft 125 of the actuator 106 is arranged parallel to the above-mentioned input shaft 101 and output shaft 87. That is, the actuator 106 which has a cylindrical shape and is elongated in the direction of the rotary shaft 125 is arranged parallel to the input shaft 101 and the output shaft 87.

FIG. 6 also shows a nut 132 which mounts the drum 100 on the input shaft 101, a bearing 13 which is interposed between an end portion of the output shaft 87 and an end portion of the second casing 130 for rotatably supporting the output shaft 87, a collar 134 which is interposed between the bearing 119 and the bearing 133 and is provided around the output shaft 87, a ring-like spacer 135 which is interposed between the bearing 133 and the first arm member 88 and is provided around the output shaft 87, a nut 136 which mounts the first arm member 88 on a distal end of the output shaft 87, and lead lines 137, 137 which supply electricity to the actuator 106.

The manner of operation of the throttle control device 84 is explained hereinafter. When the throttle grip is rotated in the direction toward a side that the throttle valve is opened, the rotation of the throttle grip is transmitted to the drum 100 by way of the wire.

When the actuator 106 is stopped, the large gear 103 which is meshed with the drive gear 105 by way of the intermediate gear 104 is held in a stopped state. When the input shaft 101 which is connected with the drum 100 is rotated in this state, the rotation of the input shaft 101 is transmitted to the small bevel gears 116 . . . from the input-side bevel gear 111 and, thereafter, the rotation is transmitted from the small bevel gears 116 . . . to the output-side bevel gear 117 and hence, the output shaft 87 is rotated. Here, since the small bevel gears 116 . . . are rotated on their axes and hence, the output shaft 87 is rotated at the same speed as the rotation of the input shaft 101 and in the direction opposite to the rotational direction of the input shaft 101.

Further, when the actuator 106 is operated so as to rotate the rotary shaft 125 of the actuator 106 in the same rotational direction as the input shaft 101 (that is, the direction opposite to the rotational direction of the output shaft 87), the large gear 103 is rotated in the same direction as the input shaft 101 and hence, the small bevel gears 116 . . . are revolved while being rotated on their axes whereby the rotation of the output shaft 87 becomes slower than the rotation of the input shaft 101.

To the contrary, when the rotary shaft 125 of the actuator 106 is rotated in the rotational direction opposite to the rotational direction of the input shaft 101 (that is, in the same direction as the output shaft 87), the large gear 103 is rotated in the direction opposite to the rotational direction of the input shaft 101 and hence, the small bevel gears 116 . . . are revolved while rotating about their axes whereby the rotation of the output shaft 87 becomes faster than the rotation of the input shaft 101

Figure 7:
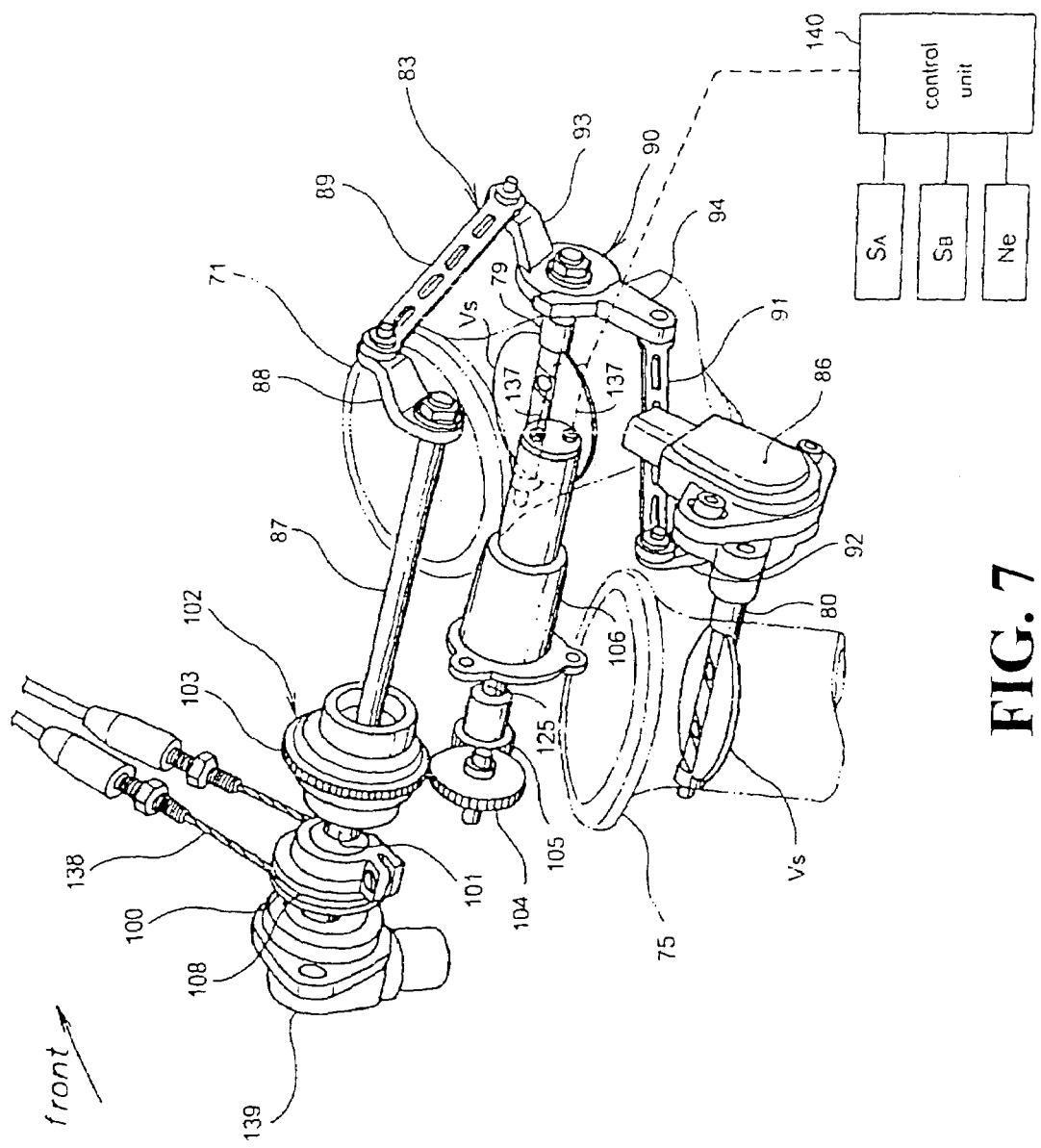
FIG. 7 is a perspective view showing the constitution of the throttle control device.

The rotational direction and the rotational speed of the above-mentioned actuator 106 are determined in response to control signals from a control unit 140 (see FIG. 7). In performing the shift-down control, the rotational direction and the rotational speed of the actuator 106 are determined using a data table described later in view of FIG. 8 and FIG. 9 which is stored in the control unit 140. To the control unit 140, as shown in FIG. 7, an engine rotational speed Ne, detection signals from the shift operation detector $S_A$, the detection signals of the shift drum operation detector $S_B$ and the like are inputted. Here, the shift-down control is explained in detail later in conjunction with FIG. 11 and FIG. 13.

FIG. 7 is a perspective view of the throttle control device 84. The input shaft 101 is mounted on the drum 100 which allows the winding of the wire 138 in the wire groove 108 thereof, and the output shaft 87 is connected to the input shaft 101 by way of the power transmission device 102. The first arm member 88 is mounted on the distal end of the output shaft 87, while one end of the first link 89 is mounted on the first arm member 82 swingably. Further, on the front valve shaft 79 to which the throttle valve $V_s$ is mounted, the second arm member 90 is mounted, while another end of the first link 89 is mounted on the front arm portion 93 of the second arm member 90. One end of the second link 91 is mounted on the rear arm portion 94 of the second arm member 90, while after mounting the throttle valve $V_s$, the third arm member 92 and the throttle opening sensor 86 are mounted on an end portion of the valve shaft 80. Further, another end of the second link 91 is mounted on the third arm member 92, the drive gear 105 is meshed with the large gear 103 of the power transmission device 102 by way of the intermediate gear 104, and the rotary shaft 125 of the actuator is connected with the drive gear 105. Here, numeral 139 indicates a drum angle sensor which is connected to the drum 100 to detect a rotational angle of the drum 100, wherein the rotational angle of the drum 100 is a value which is proportional to a rotational angle of the throttle grip.

Here, although a butterfly valve is used as the throttle valve in this embodiment of the present invention, the throttle valve is not limited to the butterfly valve. The throttle valve may be formed of a slide valve which changes a cross-sectional area of the intake air passage in response to a rotational angle of a valve shaft by traversing the intake air passage when the valve shaft is rotated.

Figure 8:
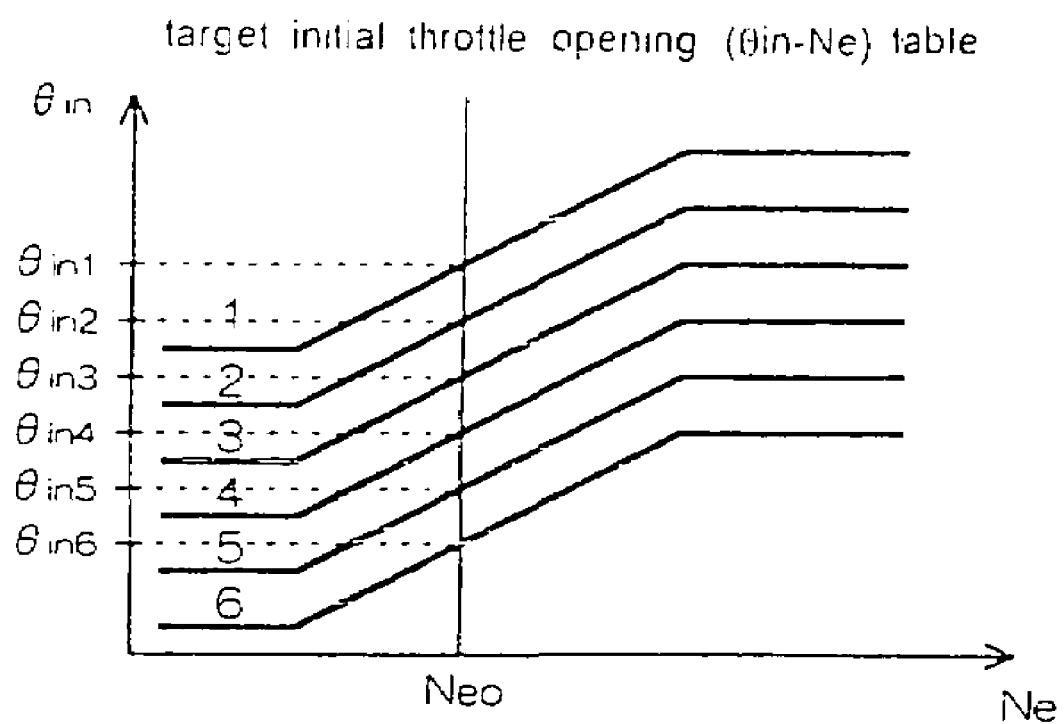
FIG. 8 is a data table on a target throttle opening according to the first embodiment of the present invention.

Here, the function and the manner of operation of the first embodiment of the present invention are explained in conjunction with FIGS. 8 to 11. FIG. 8 shows a table (target initial throttle opening table) which is used to obtain a target initial throttle opening (θin) when the shift-down manipulation is performed based on the rotational speed (Ne) of the engine. The engine rotational speed is taken on an axis of abscissas and the target initial throttle openings in respective gear shift positions are taken on an axis of ordinates. From this table, it is understood that when the rotational speed of the engine is Neo, the target initial throttle opening in the third speed becomes θin3.

Next, FIG. 9 shows a data table on throttle opening, time and attenuation ratio for reducing a shock attributed to the fluctuation of the torque at the time of performing the shift-down operation as much as possible. The data table includes gear shift positions (speeds), and a first, a second . . . nth segments, wherein each segment is constituted of a throttle (Th) opening θin, a segment time tn, an attenuation ratio αn. For example, with respect to the case of the third speed, the throttle (Th) opening θin, the segment time tn, the attenuation ratio αn in the first section respectively become θin3-I, tin3-I, αin3-I, the throttle (Th) opening θin, the segment time tn, the attenuation ratio αn in the second section respectively become θin3-II, tin3-II, αin3-II, and the throttle (Th) opening θin, the segment time tn, the attenuation ratio αn in the nth section respectively become θin3-n, tin3-n, αin3-n. This table is preliminarily obtained by an experiment and is stored in the inside of the above-mentioned control unit 140 or in a memory or the like which can be obtained by getting access to the control unit 140.

Figure 10:
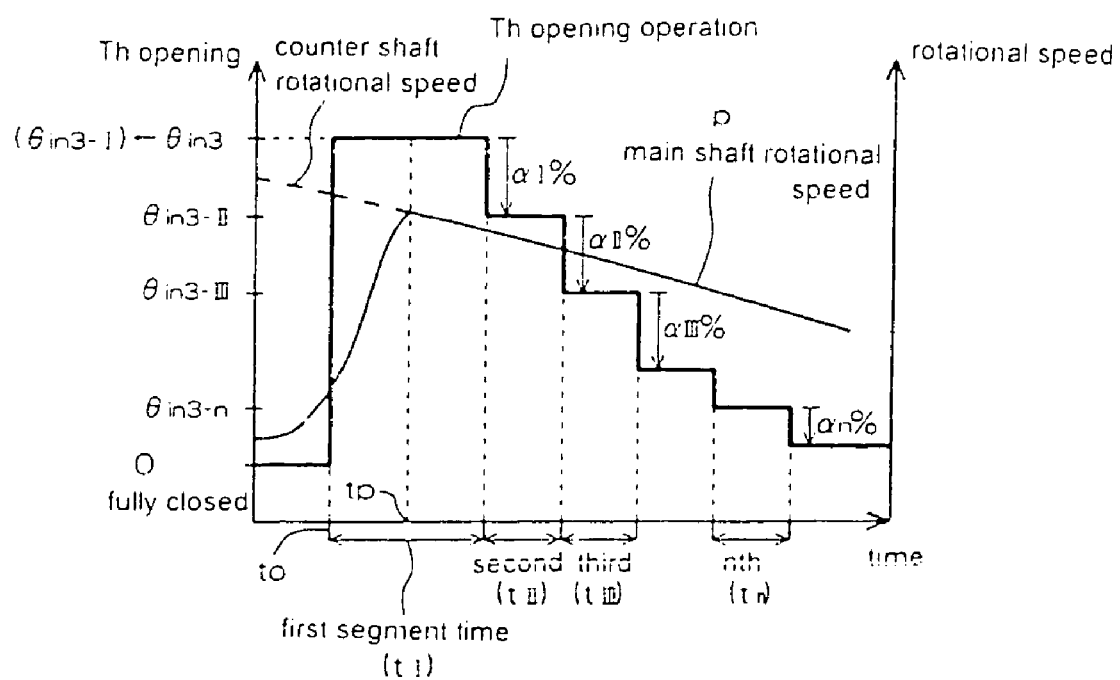
FIG. 10 is a view showing an operational state of a throttle valve at the time of performing an actuator control by a control unit.

FIG. 10 is a view showing the throttle operation and the engine rotational speed when the shift-down is performed from the third speed to the second speed, for example, using the data shown in FIG. 9. Time is taken on an axis of abscissas, while a throttle opening is taken on a left-side axis of ordinates and a main counter shaft rotational speed is taken on a right-side axis of ordinates.

When the shift-down operation (shift-down manipulation starting time) is detected at a point of time t0, a control to increase the engine output by controlling the opening of the throttle valve is performed. That is, the target initial throttle opening θin3 is obtained based on the table shown in FIG. 8 and the throttle opening is set to θin3. At a point of time tp, the shift drum 157 is rotated by 60°, for example, and the shift change is completed. Thereafter, the operation to gradually close the throttle valve is performed. That is, the state in which the throttle opening is θin3 is held during the first segment time tin3-I set by the table in FIG. 9. When the first segment time elapses, the throttle opening is attenuated with the attenuation ratio of αin3-I % and the throttle opening is set to θin3-II. Subsequently, this state is held during the second segment time tin3-II. When the second segment time elapses, the throttle opening is attenuated with the attenuation ratio of αin3-II % and the throttle opening is set to θin3-III. Hereinafter, similar controls are performed and when the nth segment time elapses, the throttle opening is attenuated with the attenuation ratio of αin3-n % and the throttle opening is returned to the fully closed state.

In the above-mentioned manner, when the throttle opening is controlled, the main-shaft rotational speed is smoothly changed as indicated by a curved line p shown in the drawings and hence, the reduction of the shock attributed to the fluctuation of the torque at the time of performing the shift-down can be largely improved.

Figure 11:
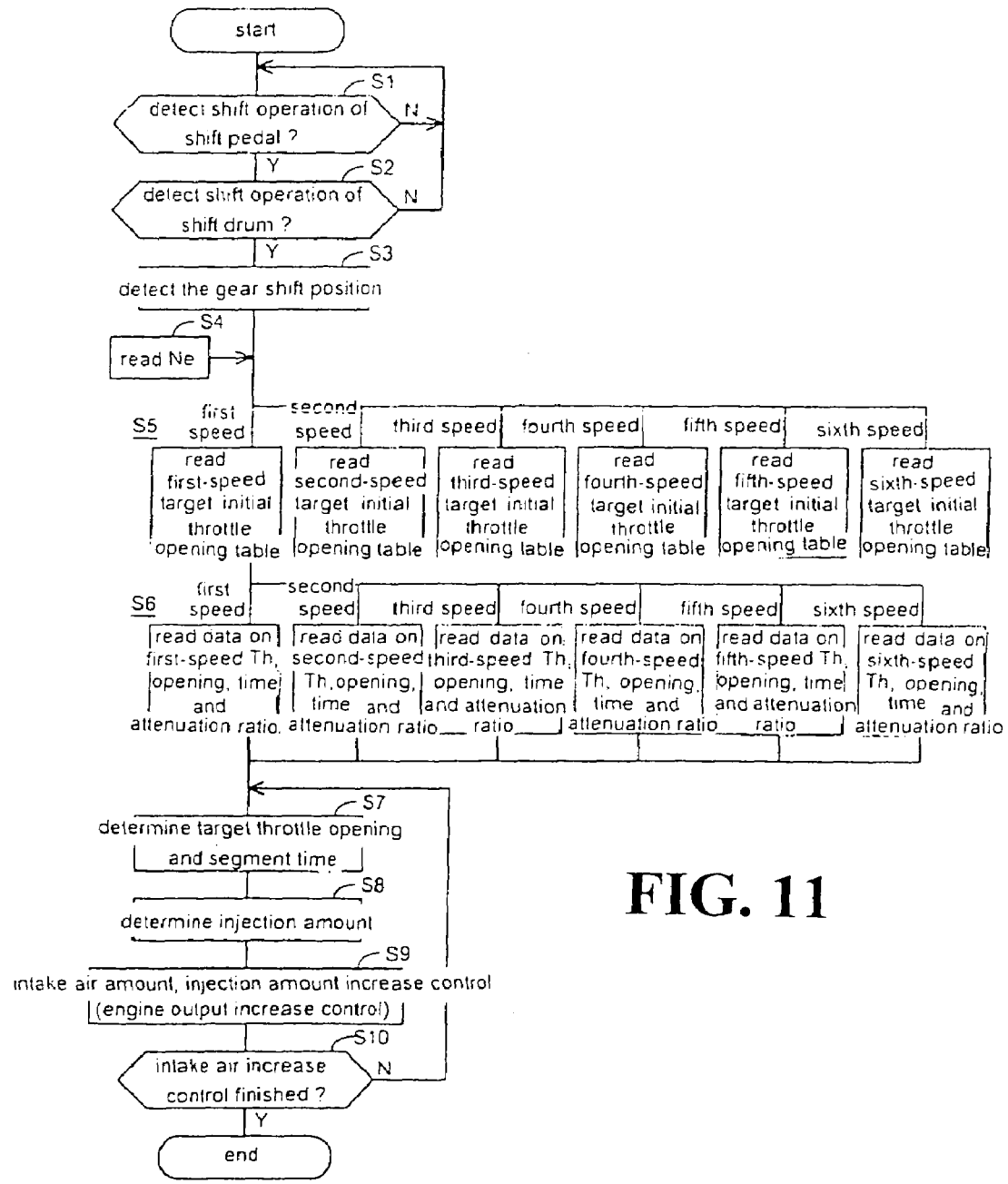
FIG. 11 is a flow chart showing the manner of operation of the control device according to the first embodiment of the present invention.

Next, processing steps of a shift-down control which is preset in the above-mentioned control unit 140 is explained in conjunction with FIG. 11. FIG. 11 is a flow chart showing an algorism of the shift-down control. In step S1, using the shift operation detector $S_A$ (see FIG. 2) which is provided to the shift device 61, the control unit 140 determines whether the shift operation is performed or not. The above-mentioned shift operation detector $S_A$ used in this embodiment is a load sensor which outputs a load applied to the shift pedal 60 in a form of pulse signals shown in FIG. 12a, wherein the control unit 140 determines that the shift change is firstly performed when the detected pulse exceeds a preset threshold value T.

Figure 12:
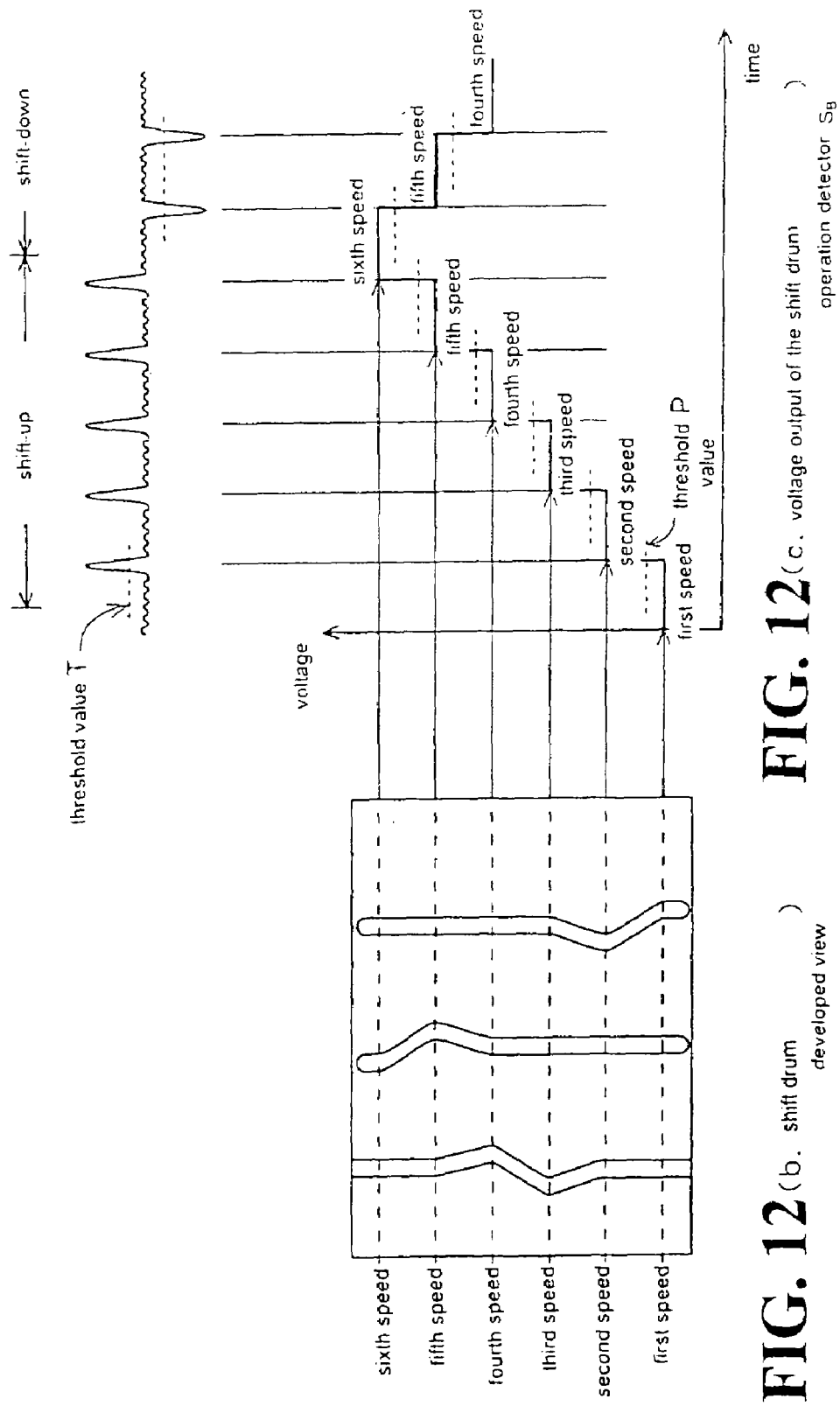
FIGS. 12(a) to 12(c) are views showing output signals from a shift operation detector and a shift pedal operation detector.

In step S2, the control unit 140 determines whether the shift operation is performed or not using the shift drum operation detector $S_B$ (see FIG. 4) provided to the shift drum 157. In this embodiment, the above-mentioned shift drum operation detector $S_B$ outputs reference voltages which are preset corresponding to respective gear shift positions as shown in FIG. 12b and FIG. 12c. The above-mentioned control unit 140 determines that the shift change is firstly performed when the detected voltage exceeds the preset threshold value P and hence, it is possible to determine whether the shift operation is performed or not in a stable manner. Further, only when both of the above-mentioned step S1 and step S2 are established, the processing advances to step S3. Accordingly, in spite of the fact that a rider has no intention of performing the transmission, when the rider applies a delicate load to the shift pedal 60 and the shift operation detector $S_A$ detects the load, or when the shift operation detector $S_A$ detects an excessive electric noise generated in the shift operation detector $S_A$, the shift-down control is not allowed when the shift drum is not rotated whereby it is possible to prevent the erroneous shift-down manipulation.

In step S3, the detection of the gear shift positions is performed based on a rotational angle displacement amount which the above-mentioned shift drum operation detector $S_B$ detects. In step S4, the engine rotational speed Ne is detected. In succeeding step S5, using the target initial throttle opening table shown in FIG. 8, the target initial throttle opening Oin for every gear shift position detected in the above-mentioned step S3 based on the engine rotational speed Ne is read. In step S6, using the throttle opening, time and attenuation data table shown in FIG. 9, the control unit 140 reads the segment time t and the attenuation ratio α corresponding to the above-mentioned gear shift position. In step S7, based on the read data, the target throttle opening and the segment time are determined. In step S8, an optimum fuel injection amount is determined based on a separate fuel injection map for intake air amount control which is separately provided apart from the usual driving. In step S9, based on the data determined in step S7 and step S8, the control unit 140 drives the actuator 106 and a fuel injection device. When the actuator 106 is driven, the throttle valve which is connected with the actuator 106 is operated and hence, the intake air amount increase control (engine output increase control) is performed. In step S10, the control unit 140 determines whether the intake air amount increase control and the fuel injection control are finished or not. When this determination is negative, the processing returns to step S7 and the processing of the above-mentioned steps S7 to S10 is performed. Due to such processing, with respect to the respective given times set in the first to nth segments in the throttle opening, time and attenuation data table (FIG. 9), the control from the target initial throttle opening to the throttle opening which is obtained by the gradual attenuation is performed. Finally, when the throttle is fully closed, the above-mentioned series of intake air amount increase control is finished.

Figure 13:
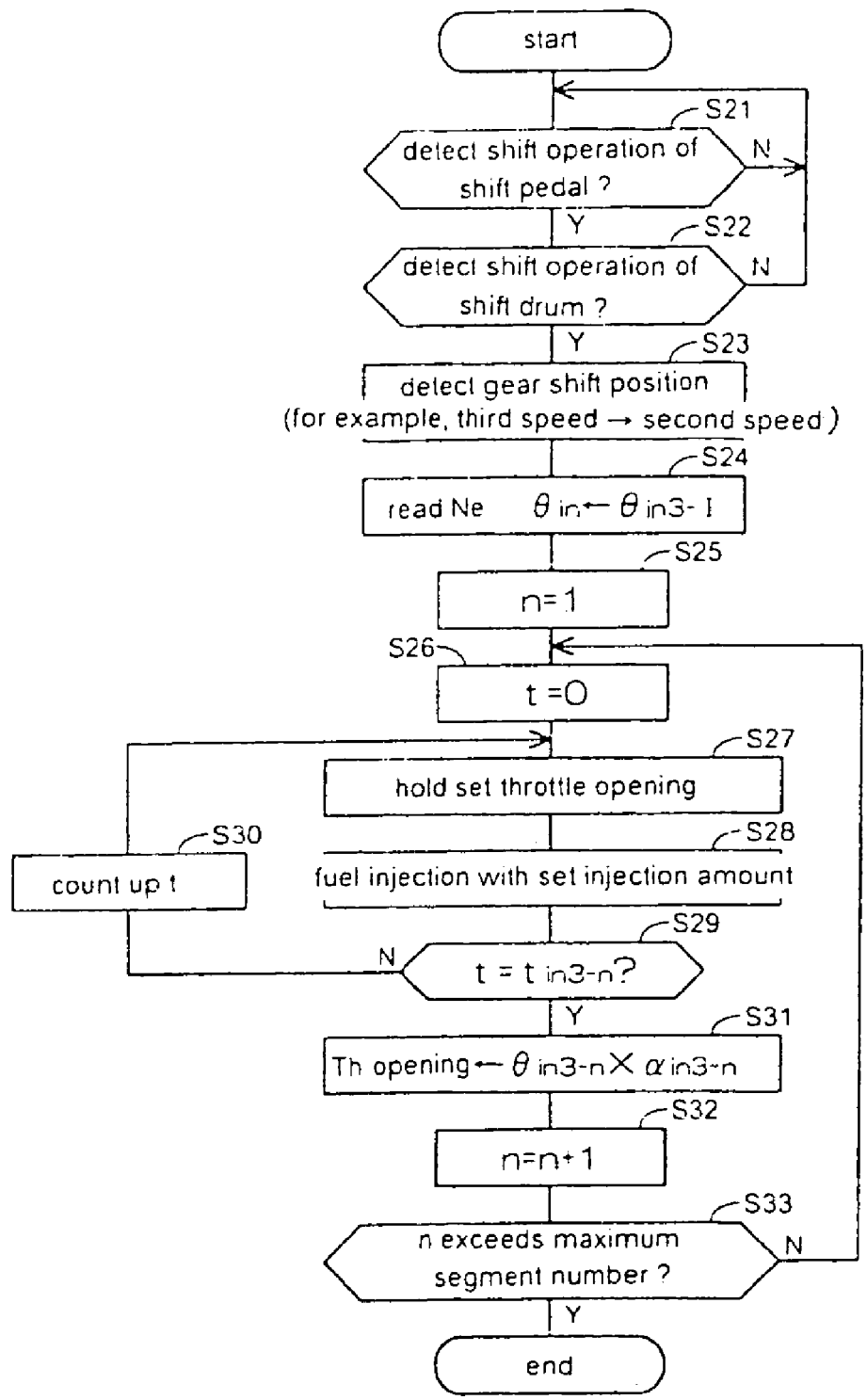
FIG. 13 is another flow chart showing the manner of operation of the control device according to the first embodiment of the present invention.

Next, the above-mentioned shift-down control is specifically explained in conjunction with a flow chart shown in FIG. 13. Steps S21, S22, S23 and S24 are steps equal to the steps S1, S2, S3 and S4 shown in FIG. 11 and hence, the explanation of these steps is omitted. However, assuming that, for example, the third speed is detected in step S23, the following explanation is made. In step S25, the position number n which expresses the segment number in FIG. 9 is set as 1, while in step S26, the time is set as t=0. In step S27, the set throttle opening is held. Firstly, based on the engine rotational speed Ne obtained in step S24, the target initial throttle opening which is obtained from the data table shown in FIG. 8 is applied. In step S28, the fuel injection is performed with the set injection quantity. In step S29, the control unit 140 determines whether the time t becomes the segment time tin3-n or not. When the determination is negative, the processing advances to step S30 and the time t is counted up. Then, the processing returns to step S27 and the processing of the above-mentioned steps S27, S28 are continued until the determination in step S29 becomes affirmative.

When the determination in step S29 becomes affirmative, the processing advances to step S31 and the throttle opening is attenuated to target attenuation ratio αin3-n %. Next, 1 is added to n in step S32 and the control unit 140 determines whether n exceeds the maximum segment number or not in step S33. When this determination is negative, the processing advances to step S26 and the time t is again reset to 0 and the control of the second segment is executed. When the above-mentioned operations are repeatedly executed and the determination in step S33 becomes affirmative, the intake air amount control when the gear shift position is changed from the third speed to the second speed is completed.

Due to the above-mentioned respective steps shown in FIG. 11 and FIG. 13, by performing the open/close control of the throttle valve using the actuator for respective gear shift positions, it is possible to perform the optimum controls of engine output in conformity with respective gear shift positions whereby it is possible to smoothly perform the transmission operation without requiring the clutch operation. Further, the embodiment adopts the intake air amount control and hence, it is possible to control the engine output more precisely compared to the ignition time control.

Further, the clutchless manipulation at the time of performing the shift-down using only the conventional ignition timing control cannot obtain the large increase of engine output and hence, the clutchless manipulation has been difficult. In this embodiment, by performing the valve opening control of the throttle valve and thereby increasing the engine output, it is possible to perform the clutchless manipulation with the simple means and control.

Further, since the control is performed to allow the gradual closing of the throttle valve upon completion of the shift change in the shift-down, even when the engine output torque is transmitted to the rear wheel by way of the transmission, it is possible to reduce the shock attributed to the fluctuation of torque.

Figure 14:
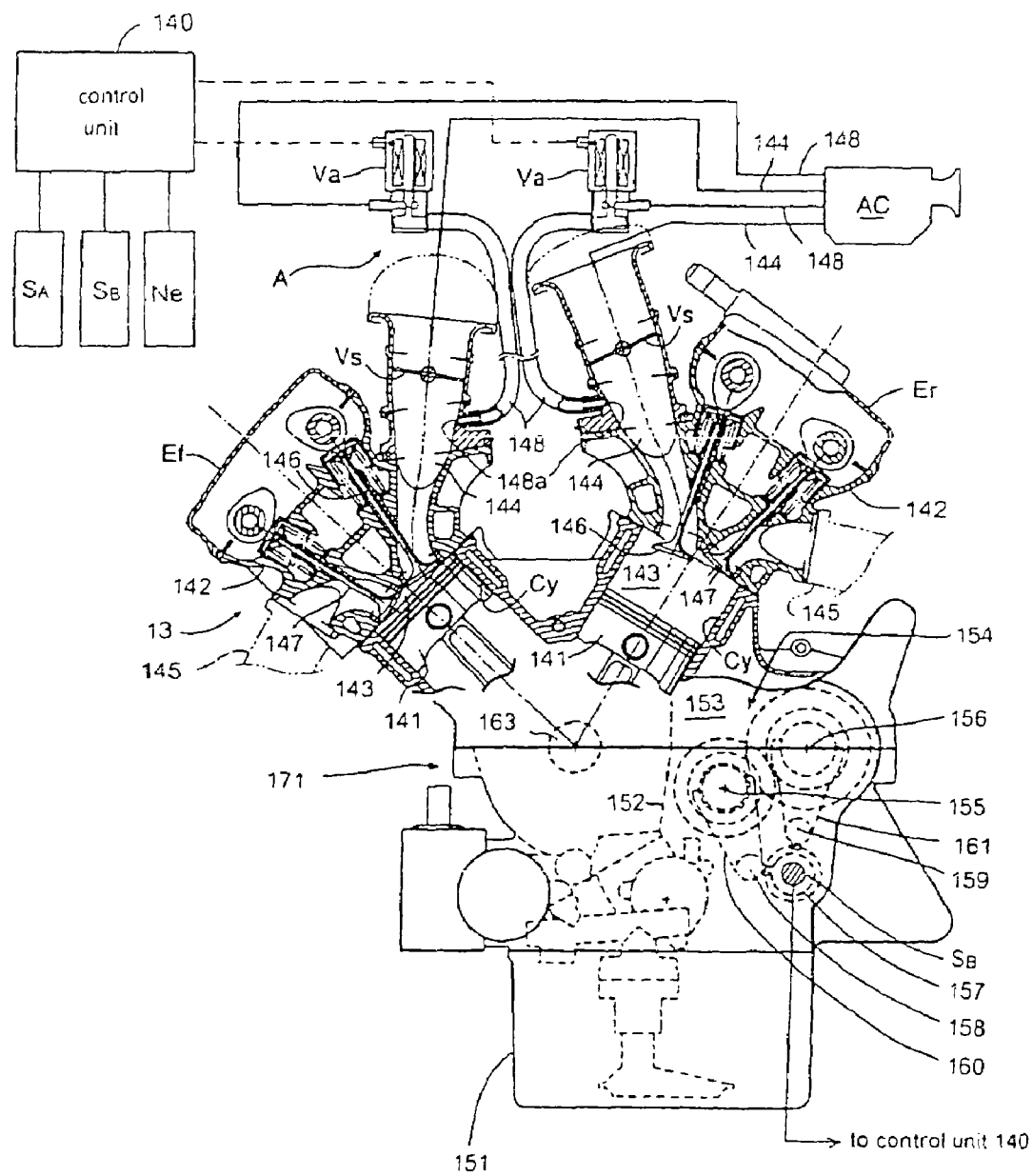
FIG. 14 is a view showing the constitution of an engine which includes a bypass device according to the second embodiment of the present invention.

Next, the second embodiment of the present invention is explained in conjunction with FIG. 14. In the second embodiment, by performing an intake air control using an open/close valve provided to a bypass passage which is connected with an intake air passage, a smooth control of engine output can be performed for every gear shift position. Here, in FIG. 14, symbols equal to the symbols used in FIG. 4 indicate the identical constitutions and hence, the explanation of the constitutions indicated by equal symbols is omitted.

An upstream end of the intake air passage 144 is communicated with the atmosphere by way of an air cleaner AC and, to a midst portion of the intake air passage 144, a throttle valve Vs which is opened or closed in an interlocking manner with the throttle manipulation is provided. With the provision of this throttle valve Vs, it is possible to control an intake air amount to a cylinder Cy corresponding to the throttle valve Vs. Here, the air cleaner AC is arranged in a V-shaped space defined between front and rear banks Ef, Er in the illustrated example.

The bypass device A includes, downstream of a throttle valve Vs of the intake air passage 144, an air supply passage 148 which has one end opened and another end communicated with atmosphere by way of the air cleaner AC, an open/close valve Va which is capable of opening and closing the air supply passage 148, and a control unit 140 which is capable of performing a valve opening control of the open/close valve Va in response to information from various sensors and the like. As the control unit, a vehicle-mounted microcomputer or the like can be used. The open/close valve Va is constituted of a normally-closed electromagnetic valve in the illustrated example and performs a valve-opening operation or a valve-closing operation in response to an open/close command signal from the control unit 140. In the second embodiment, one bypass intake air supply passage 148 is provided to each cylinder of the multi-cylinder engine and the controllable open/close valve Va is provided to a midst portion of each intake air supply passage 148.

Figures 15, 16:
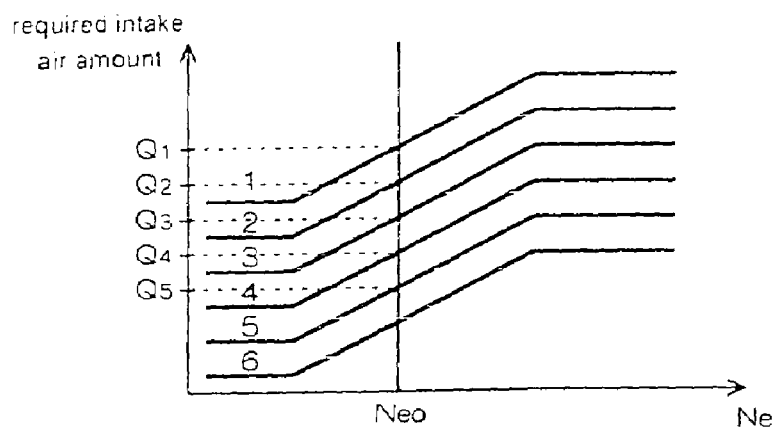
FIG. 15 is a data table on a required intake air amount according to the second embodiment of the present invention.
FIG. 16 is a data table on the number of open/close valves according to the second embodiment of the present invention.
Figure 17:
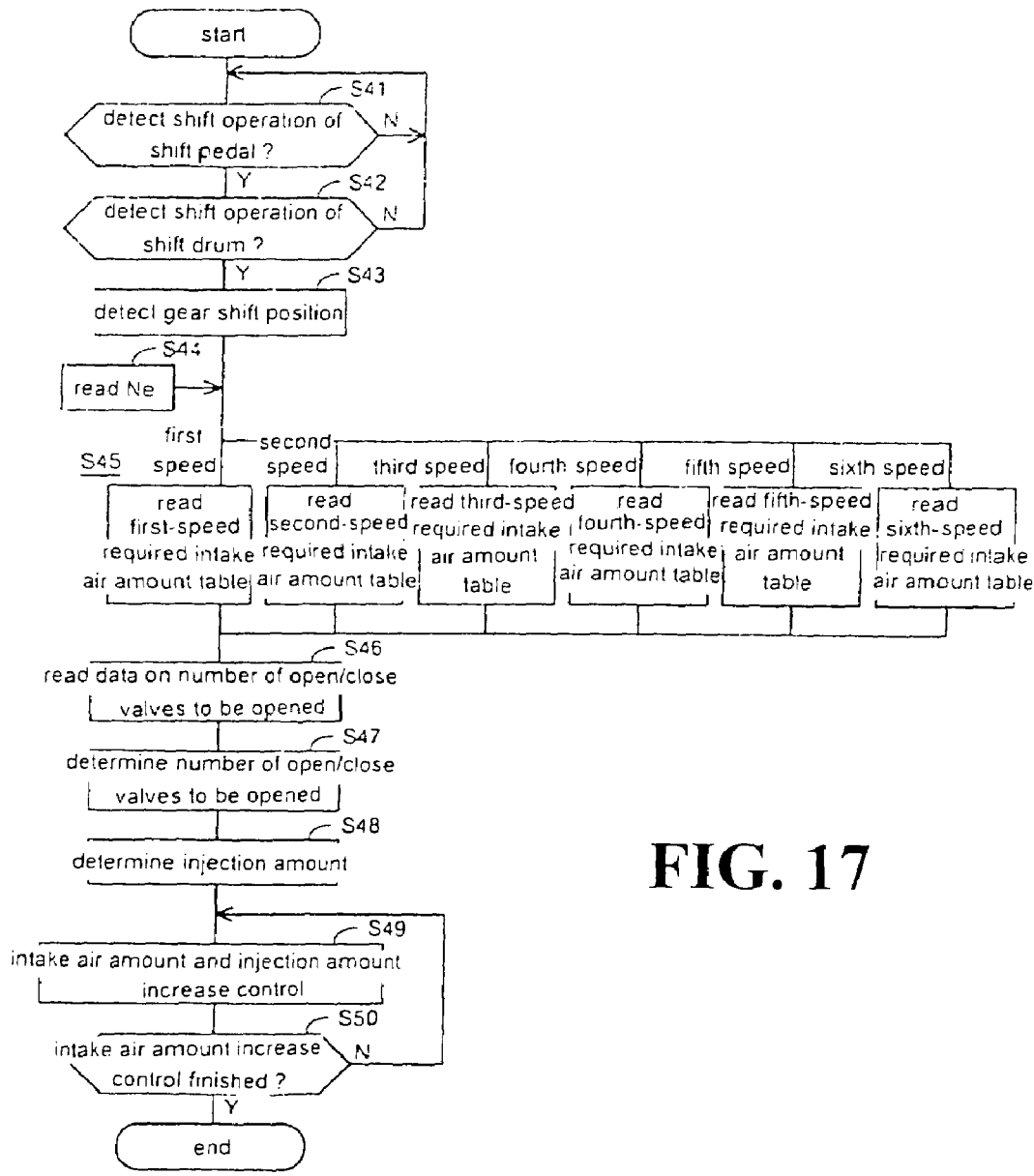
FIG. 17 is a flow chart showing the manner of operation of the control device according to the second embodiment of the present invention.

Next, the manner of operation of the above-mentioned control unit 140 is explained in conjunction with FIG. 15 to FIG. 17. These drawings show an example in which a 5-cylinder-type engine is adopted, wherein FIG. 15 is a view which shows a required intake air amount Q with respect to the engine rotational speed Ne for every gear shift position, and FIG. 16 is a view showing the relationship between the required intake air amount Q and the open/close valve which is opened to obtain the required intake air amount Q.

Further, FIG. 17 is a flow chart showing a function and the manner of operation of the above-mentioned control unit.

FIG. 15 shows that when the engine rotational speed is Neo, the required intake air amount Q when the gear shift positions are the fifth speed to the first speed respectively are $Q_5$ to $Q_1$ respectively. Further, FIG. 16 shows that when the required intake air amount Q is any one of $Q_5$ to $Q_1$, the number of the opened open-close valves becomes 1 to 5 respectively. Here, the data shown in FIGS. 15 and 16 are data which are preliminarily obtained by an experiment or the like and are stored in the inside of the control unit or in a storage device to which the control unit can get access.

Steps S41 to S44 shown in FIG. 17 are processing equal to the processing in step S1 to S4 in FIG. 11 and hence, the explanation is omitted. In step S45, the current gear shift position and the required intake air amount Q corresponding to the engine rotational speed Ne are obtained from the data shown in FIG. 15. For example, when the current gear shift position is the third speed, the required intake air amount Q becomes $Q_3$. In step S46, from the data shown in FIG. 16, the data on the number of the open/close valves to be opened corresponding to the required intake air amount Q is read. Then, in step S47, the number of open/close valves to be opened is determined. For example, when the required intake air amount Q is $Q_3$ as described above, the number of open/close valves to be opened become three. In step S48, an injection amount to be increased is determined and in step S49, a control which increases the intake air quantity by opening the number of open/close valves which are determined in step S47 and increases a fuel injection amount corresponding to the cylinder is performed. In step S50, the control unit determines whether the intake-air-amount increase control is finished or not, and when the determination is negative, the operation in step S49 is continued. When the determination in step S50 is affirmative, the above-mentioned series of operations are finished.

According to the second embodiment, the control unit controls the engine output by controlling the open/close valve provided to the bypass circuit in response to respective gear shift positions and hence, it is possible to smoothly perform the optimum control of the engine output which conforms to the respective gear shift positions and it is also possible to smoothly perform the transmission manipulation which requires no clutch manipulation. Further, a relatively small valve can be used as the open/close valve and hence, the open/close manipulation of the open/close valve can be performed rapidly whereby the engine output control and the transmission manipulation can be performed more quickly. Further, the intake air amount is controlled by controlling the number of open/close valves to be opened and hence, the intake air amount control can be performed in a more simplified manner. Accordingly, a load applied to the control unit can be reduced.

Figures 18, 19:
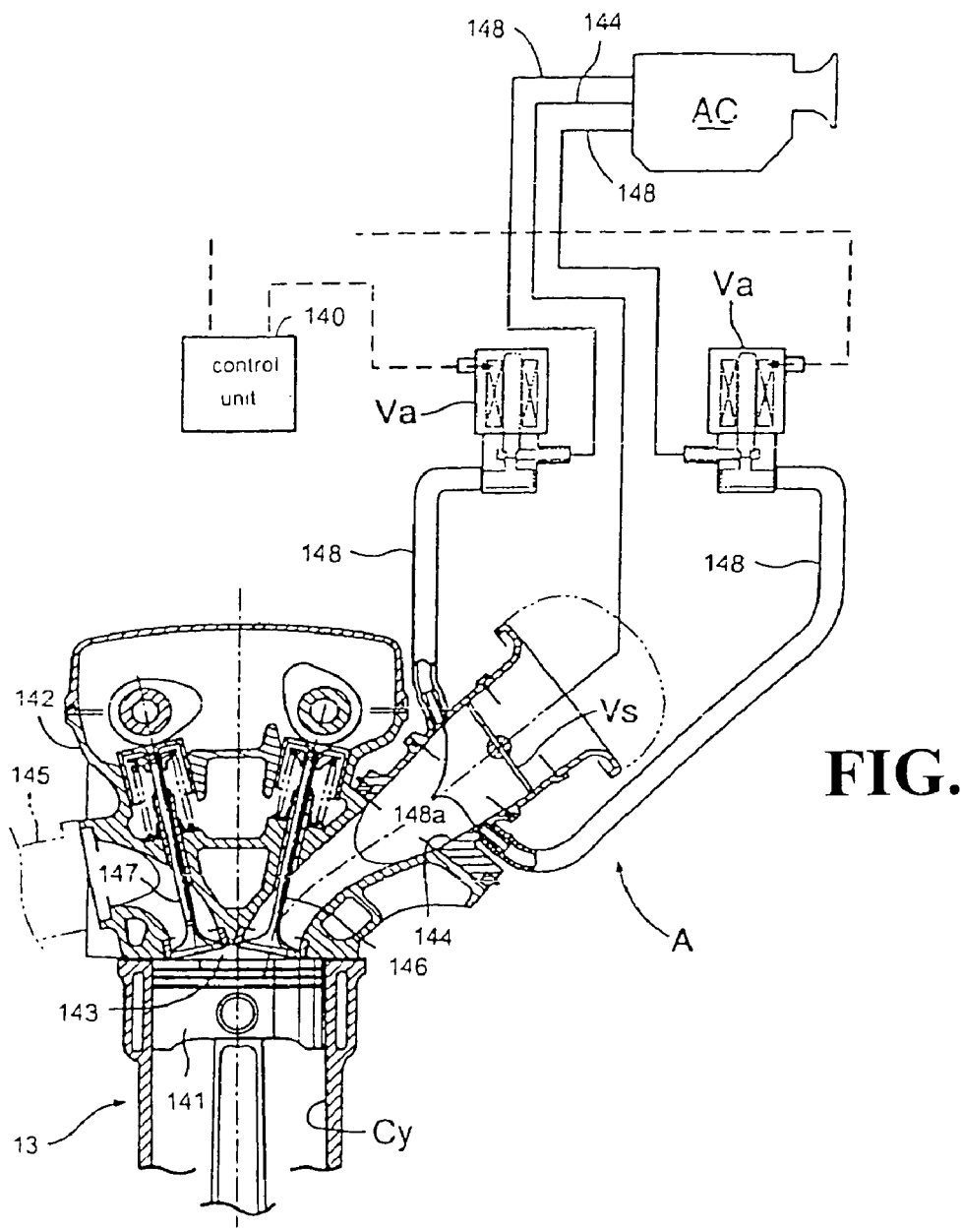
FIG. 18 is a view showing the constitution of a bypass device according to a modification of the second embodiment of the present invention.
FIG. 19 is a data table on the number of open/close valves according to a modification of the second embodiment of the present invention.

Next, a first modification of the second embodiment is explained in conjunction with FIG. 18. Here, in FIG. 18, symbols equal to the symbols used in FIG. 14 indicate the identical parts and hence, the explanation of the parts indicated by equal symbols is omitted.

In the first modification, a plurality of (two in the illustrated example) intake air supply passages 148 are provided to one intake air passage 144 corresponding to one cylinder Cy and, at the same time, open/close valves Va are individually provided to the respective intake air supply passages 148. For example, when the engine is a five-cylinder type engine, the total numbers of the intake air supply passage 148 and the open/close valves Va become ten respectively.

In the intake air amount control in this modification, to obtain the required intake air amount Q corresponding to the gear shift position and the engine rotational speed Ne, the number of open/close valves to be opened is determined as shown in FIG. 19, for example. The intake air control performed by the above-mentioned control unit is performed in the same manner as the intake air control shown in FIG. 17 and hence, the explanation of the intake air control is omitted. However, it is preferable to select the open/close valves to be opened such that increased portions of intake air amounts supplied to respective cylinders become uniform as much as possible.

Figure 20:
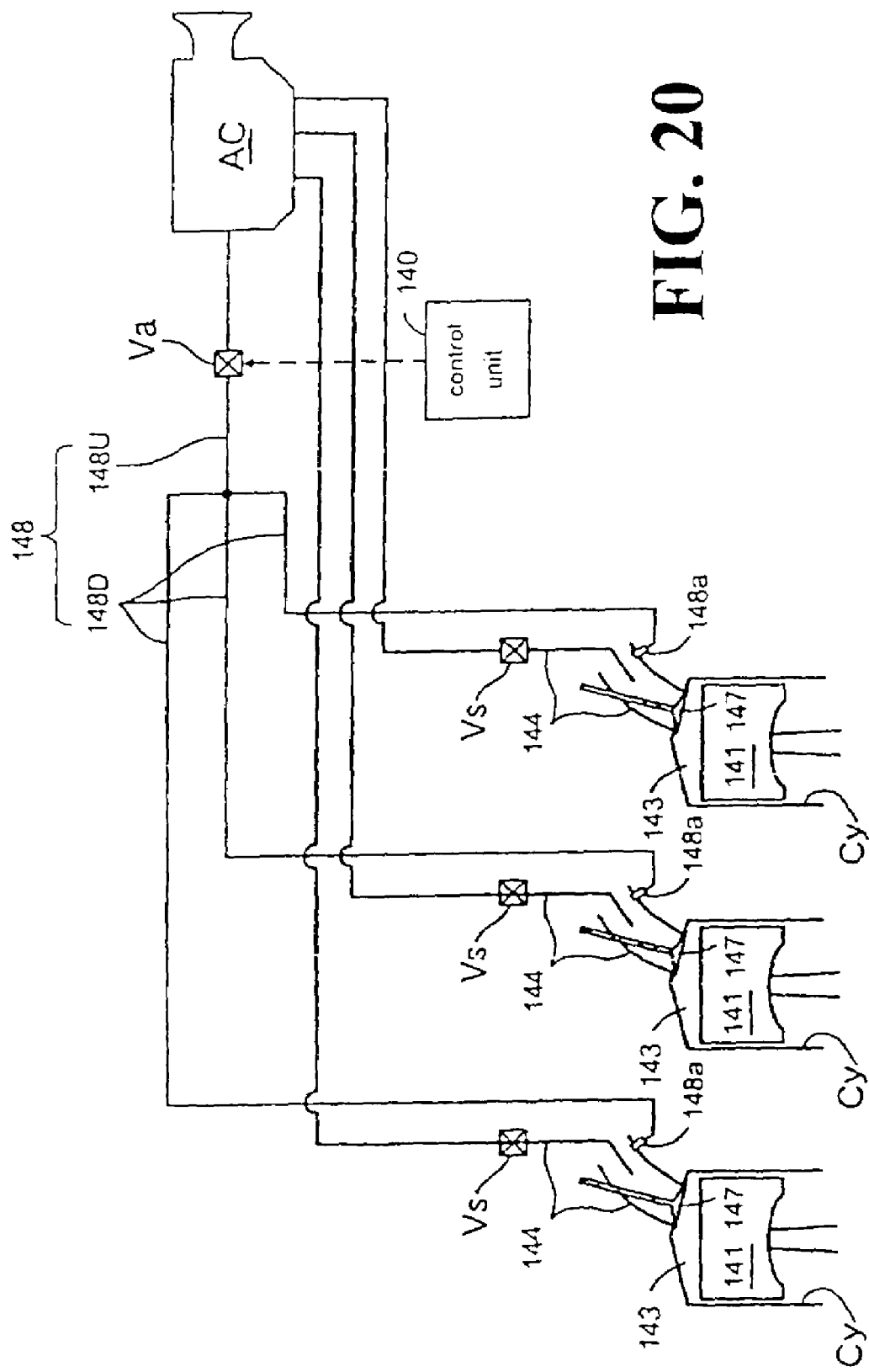
FIG. 20 is a view showing the constitution of a bypass device according to a second modification of the second embodiment of the present invention.

Next, a second modification of the above-mentioned second embodiment is explained in conjunction with FIG. 20. Here, in FIG. 20, symbols equal to the symbols used in FIG. 14 indicate the identical or equivalent parts.

In the second modification, an intake air supply passage 148 is constituted of one upstream-side passage portion 148U which is connected to an air cleaner AC, a plurality of downstream-side passage portions 148D which open at downstream sides of throttle valves Vs of a plurality of cylinders Cy of a multi-cylinder engine, and one open/close valve Va which is provided to a midst of the upstream-side passage portion 148U. In the intake air amount control according to this modification, to obtain the required intake air amount Q which corresponds to the gear shift position and the engine rotational speed Ne, the control unit 140 opens the above-mentioned open/close valves Va so as to increase the intake air amount to the respective cylinders.

Here, in FIG. 20, although the downstream-side passage portion 148D is connected with all cylinders Cy, the modification includes an engine in which the downstream-side passage portion is connected with at least two or more cylinders Cy that are not all cylinders Cy.

According to the second modification, it is possible to perform the intake air amount control of the whole cylinders using one open/close valve and hence, it is possible to smoothly perform the transmission manipulation which requires no clutch manipulation.

Further, in the first modification and the second modification of the second embodiment, the control unit performs the control to determine the number of open/close valves which are subjected to valve-opening control after the completion of the shift change in the shift-down. However, in addition to such a control, the open/close valves to which the valve-opening control is applied are gradually closed along with a lapse of time so as to gradually decrease the intake air amount. Further, the intake air amount control may be combined with the first embodiment (actuator control) and the second embodiment (bypass open/close control). As an advantageous effects obtained by such a combination, it is possible to obtain the further increase of the large output and the more precise control of the engine output.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission control device of a motorcycle comprising:
   a shift manipulation member which performs a shift operation;
   a shift operation detector which is arranged on a member which is operated by an operation of the shift manipulation member; and
   a shifter which is interlockingly connected with the shift manipulation member and is capable of transmitting a drive torque of an engine by selecting a gear among gears at a plurality of gear shift positions with the manipulation of the shift manipulation member,
   wherein the transmission control device further includes
      a gear shift position detection means which detects a position of the gear shift position,
      a control unit which determines a shift operation starting time in response a detection signal of the shift operation detector, and controls at least an intake air amount to the engine corresponding to the gear shift position detected by the gear shift position detection means thus controlling the engine so as to allow an output of the engine to be changed smoothly,
      wherein the shift operations detector is a sensor capable of detecting whether or not a predetermined physical load applied has been applied by a motorcycle rider to the shift manipulation member.

2. The transmission control device of a motorcycle according to claim 1, wherein the shift operations detector ouputs the physical load applied to the shift manipulation member as pulse signals.

3. The transmission control device of a motorcycle according to claim 1, wherein the shift manipulation member is a shift pedal operated by the motorcycle rider.

4. The transmission control device of a motorcycle according to claim 1, wherein the transmission control device further includes
   an intake air amount control means which is provided to an intake air passage which is connected with the engine and controls an intake air amount to the engine, and
   an actuator which is connected with the intake air amount control means and controls opening and closing of the intake air amount control means,
   wherein the control unit controls the intake air amount to the engine by controlling the actuator thus allowing the output of the engine to be changed smoothly.

5. The transmission control device of a motorcycle according to claim 4, wherein the control unit performs an opening control of the intake air amount control means when the control unit determines a shift-down manipulation starting time based on the shift operation detector.

6. The transmission control device of a motorcycle according to claim 5, wherein the control unit controls a degree of opening and opening time of the intake air amount control means upon completion of a shift change in a shift-down thus gradually closing the intake air amount control means.

7. The transmission control device of a motorcycle according to claim 1, wherein the transmission control device further includes
   an intake air amount control means which is provided to an intake air passage which is connected with the engine and controls the intake air amount to the engine,
   a bypass passage which bypasses the intake air amount control means and connects an upstream side and a downstream side of the intake air amount control means, and
   an open/close valve which is provided to the bypass passage and controls the introduction of intake air by opening and closing thereof,
   wherein the control unit controls the intake air amount to the engine by controlling the open/close valve thus allowing the output of the engine to be changed smoothly.

8. The transmission control device of a motorcycle according to claim 7, wherein
the engine includes a plurality of cylinders and the bypass passage which includes the open/close valve is provided corresponding to each cylinder, and
the control unit controls the number of open/close valves which are opened thus controlling the intake air amount to the engine.

9. The transmission control device of a motorcycle according to claim 7, wherein the control unit performs an opening control of the open/close valves when the control unit determines a shift-down manipulation starting time based on the shift operation detector.

10. The transmission control device of a motorcycle according to claim 7, wherein the open/close valve is a normally closed electromagnetic valve, and performs an opening/closing operation in response to an opening/closing command signal from the control unit.

11. The transmission control device of a motorcycle according to claim 7, wherein the control unit stores a predetermined intake air amount for each of the gear shift positions, and controls a number of open/close valves to be opened.

12. The transmission control device of a motorcycle according to claim 7, wherein the control unit performs an opening control of the open/close valves when the control unit determines a shift-down manipulation starting time based on the shift operation detector.

13. The transmission control device of a motorcycle according to claim 12, wherein the control unit performs a control to gradually decrease the number of the open/close valves which are opened after completion of a shift change in a shift-down thus allowing the intake air amount to be gradually decreased.

14. The transmission control device of a motorcycle according to claim 1, wherein the gear shift position detection means is a shift drum operation detector which outputs reference voltages which are preset corresponding to corresponding the respective gear shift positions.

15. The transmission control device of a motorcycle according to claim 14, wherein the control unit determines that the predetermined physical load has been applied by a motorcycle rider applied to the shift manipulation member when the pulse signals exceed a preset threshold value.

16. A transmission control device of a vehicle comprising:
a shift manipulation member which performs a shift operation;
a shift operation detector which is arranged on a member which is operated by an operation of the shift manipulation member; and
a shifter which is interlockingly connected with the shift manipulation member and is capable of transmitting a drive torque of an engine by selecting a gear among gears at a plurality of gear shift positions with the manipulation of the shift manipulation member,
wherein the transmission control device further includes
a gear shift position detection means which detects a position of the gear shift position,
a control unit which determines a shift operation starting time in response a detection signal of the shift operation detector, and controls at least an intake air amount to the engine corresponding to the gear shift position detected by the gear shift position detection means thus controlling the engine so as to allow an output of the engine to be changed smoothly,
wherein the gear shift position is detected only after it has been determined by the shift operations detector that the shift operation has been performed, and also after it has been determined by the gear shift position detection means that said shift operation has been performed,
wherein the shift operations detector is a sensor capable of detecting whether or not a predetermined physical load has been applied by a motorcycle rider to the shift manipulation member.

17. The transmission control device of a vehicle according to claim 16, wherein the transmission control device further includes
an intake air amount control means which is provided to an intake air passage which is connected with the engine and controls the intake air amount to the engine, and
an actuator which is connected with the intake air amount control means and controls opening and closing of the intake air amount control means,
wherein the control unit controls the intake air amount to the engine by controlling the actuator thus allowing the output of the engine to be changed smoothly.

18. The transmission control device of a vehicle according to claim 16, wherein the transmission control device further includes
an intake air amount control means which is provided to an intake air passage which is connected with the engine and controls the intake air amount to the engine,
a bypass passage which bypasses the intake air amount control means and connects an upstream side and a downstream side of the intake air amount control means, and
an open/close valve which is provided to the bypass passage and controls the introduction of intake air by opening and closing thereof,
wherein the control unit controls the intake air amount to the engine by controlling the open/close valve thus allowing the output of the engine to be changed smoothly.

19. The transmission control device of a motorcycle according to claim 16, wherein the shift operations detector outputs the physical load applied to the shift manipulation member as pulse signals.

20. The transmission control device of a motorcycle according to claim 19, wherein the control unit determines that the predetermined physical load has been applied by a motorcycle rider applied to the shift manipulation member when the pulse signals exceed a preset threshold value.

* * * * *